US011470270B1

(12) United States Patent
Powell et al.

(10) Patent No.: US 11,470,270 B1
(45) Date of Patent: Oct. 11, 2022

(54) STAGGERED HIGH-DYNAMIC-RANGE IMAGE CAPTURE WITH LUMINANCE-DRIVEN UPSAMPLING OF PIXEL-BINNED IMAGE SENSOR ARRAY OUTPUT

(71) Applicant: Shenzhen Goodix Technology Co., Ltd., Shenzhen (CN)

(72) Inventors: Matthew Powell, San Diego, CA (US); Jinwen Xiao, San Diego, CA (US)

(73) Assignee: Shenzhen Goodix Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/581,964

(22) Filed: Jan. 23, 2022

Related U.S. Application Data

(60) Provisional application No. 63/226,731, filed on Jul. 28, 2021.

(51) Int. Cl.
| | | |
|---|---|---|
| *H04N 5/355* | (2011.01) | |
| *G06T 7/90* | (2017.01) | |
| *G06T 5/00* | (2006.01) | |
| *H04N 9/04* | (2006.01) | |
| *H04N 9/64* | (2006.01) | |
| *H04N 5/347* | (2011.01) | |

(Continued)

(52) U.S. Cl.
CPC ....... *H04N 5/35572* (2013.01); *G06T 3/4007* (2013.01); *G06T 5/009* (2013.01); *G06T 5/50* (2013.01); *G06T 7/90* (2017.01); *H04N 5/347* (2013.01); *H04N 5/3454* (2013.01); *H04N 5/3535* (2013.01); *H04N 5/378* (2013.01); *H04N 9/0455* (2018.08); *H04N 9/04515* (2018.08); *H04N 9/646* (2013.01); *G06T 2207/10024* (2013.01); *G06T 2207/20208* (2013.01); *G06T 2207/20221* (2013.01)

(58) Field of Classification Search
None
See application file for complete search history.

(56) References Cited

U.S. PATENT DOCUMENTS

| | | | | |
|---|---|---|---|---|
| 7,492,391 | B1 * | 2/2009 | Kaplinsky | .......... G06T 5/20 |
| | | | | 348/211.3 |
| 8,218,068 | B2 * | 7/2012 | Deever | .......... H04N 5/35554 |
| | | | | 348/362 |
| 9,894,304 | B1 * | 2/2018 | Smith | .......... H04N 5/35581 |

* cited by examiner

*Primary Examiner* — James M Hannett
(74) *Attorney, Agent, or Firm* — Kilpatrick Townsend & Stockton LLP

(57) ABSTRACT

Techniques are described for efficient staggered high-dynamic-range (HDR) output of an image captured using a high-pixel-count image sensor based on pixel binning followed by luminance-guided upsampling. For example, an image sensor array is configured according to a red-green-blue-luminance (RGBL) CFA pattern, such that at least 50-percent of the imaging pixels of the array are luminance (L) pixels. In each image capture time window, multiple (e.g., three) luminance-enhanced (LE) component images are generated. Each LE component image is generated by exposing the image sensor to incident illumination for a respective amount of time, using pixel binning during readout to generate appreciably downsampled color and luminance capture frames, generating an upsampled luminance guide frame from the luminance capture frame, and using the upsampled luminance guide frame to guide upsampling (e.g., and remosaicking) of the color capture frame. The resulting LE components images can be digitally combined to generate an HDR output image.

20 Claims, 13 Drawing Sheets

(51) Int. Cl.
*H04N 5/353* (2011.01)
*H04N 5/378* (2011.01)
*H04N 5/345* (2011.01)
*G06T 3/40* (2006.01)
*G06T 5/50* (2006.01)

STAGGERED HIGH-DYNAMIC-RANGE IMAGE CAPTURE WITH LUMINANCE-DRIVEN UPSAMPLING OF PIXEL-BINNED IMAGE SENSOR ARRAY OUTPUT

CROSS-REFERENCES

This application is a non-provisional of, and claims priority to, U.S. Provisional Patent Application No. 63/226,731, filed on Jul. 28, 2021, titled " STAGGERED HDR WITH PIXEL BINNING FOLLOWED BY UPSAMPLING WITH AN RGBW CFA," which is hereby incorporated by reference in its entirety.

TECHNICAL FIELD

Embodiments described herein relate to image sensor devices, and more particularly, to staggered high-dynamic-range (HDR) image capture with luminance-driven upsampling of pixel-binned image sensor array output in image sensors having red-green-blue-luminance (RGBL) color filter arrays (CFAs).

BACKGROUND

Modern image sensors with high pixel count attempt to achieve high frame rate, low read noise and high dynamic range with minimal power consumption. The basic function of a modern CMOS image sensor (CIS) is to capture photons that are converted into electrons in a photodiode. These captured electrons are read out by a series of ADCs included as part of the sensor. In the read out chain, higher power can provide lower read noise or higher dynamic range, which result in improved image quality. But higher power consumption also results in shorter battery lifetimes and thermal heating, which has intrinsic limits in consumer products and can lead to worse sensor performance in the context of CIS.

In CIS for many modern applications, such as in mobile handsets, dynamic range is intrinsically limited due to the small size of the pixel. The small pixel size is driven by the limited available area and volume for the camera on small portable electronic devices. To achieve greater dynamic range, multiple frames with different exposure times can be captured and digitally combined to create a single image. The dynamic range can be increased by the ratio of maximum and minimum exposure times using such an approach. A limitation to such as approach is that capturing multiple frames takes more time. Objects moving during the image capture operation will have greater blur and can also appear in different locations in the frames with different exposure times. This can lead to image defects or artifacts in the process of digitally combining the multiple frames.

Various conventional approaches seek to reduce such image defects and artifacts, but those conventional approaches tend to remain limited at least by readout timing. For example, in high-resolution image sensors with very high pixel counts, reading out each individual pixel in every image capture frame may consume excessive amounts of time and power. Capturing multiple image frames at different exposure times for each image capture frame further increases the already excessive consumption of time and power resources.

BRIEF SUMMARY OF THE INVENTION

Embodiments provide novel technical approaches for efficient staggered high-dynamic-range (HDR) output of an image captured using a high-pixel-count image sensor based on pixel binning followed by luminance-guided upsampling. For example, an image sensor array is configured according to a red-green-blue-luminance (RGBL) CFA pattern, such that at least 50-percent of the imaging pixels of the array are luminance (L) pixels. In each image capture time window, multiple (e.g., three) luminance-enhanced (LE) component images are generated. Each LE component image is generated by exposing the image sensor to incident illumination for a respective amount of time, using pixel binning during readout to generate appreciably downsampled color and luminance capture frames, generating an upsampled luminance guide frame from the luminance capture frame, and using the upsampled luminance guide frame to guide upsampling (e.g., and remosaicking) of the color capture frame. The resulting LE components images can be digitally combined to generate an HDR output image.

In one set of embodiments, a method is provided for high-dynamic-range (HDR) image capture using an image sensor system having an image sensor array formed by a plurality of imaging pixels configured in accordance with a red-green-blue-luminance (RGBL) color filter array (CFA) pattern and arranged to be addressable in groups of imaging pixels. The method includes: for each of N sub-frames, each nth sub-frame of the N sub-frames associated with an nth exposure window and with an nth readout window, each nth readout window starting an nth exposure time after the start of the nth exposure window, N being an integer greater than 1: sequentially exposing each group of imaging pixels of the image sensor array to incident illumination over the nth exposure window for the nth exposure time; and sequentially reading out each group of imaging pixels with pixel binning over the nth readout window, such that each group of imaging pixels is read out immediately after the group of imaging pixels is exposed to the incident illumination for the nth exposure time, and the pixel binning results, at an end of the nth readout window, in a respective one of N downsampled HDR sub-frames having a respective RGB capture frame and a respective L capture frame; generating N luminance-enhanced component images by, for each of the N downsampled HDR sub-frames, upsampling the respective L capture frame to generate a respective L guide frame, and applying luminance-guided interpolation to the respective RGB capture frame based on the respective L guide frame to upsample the RGB capture frame to form a respective one of the N luminance-enhanced component images; and combining the N luminance-enhanced component images digitally to produce a single HDR output image.

In another set of embodiments, an image sensor is provided. The image sensor includes an image sensor array, binning readout circuitry, a sensor controller, an upsampling engine, and a HDR engine. The image sensor array is formed by a plurality of imaging pixels configured in accordance with a red-green-blue-luminance (RGBL) color filter array (CFA) pattern and arranged to be addressable in groups of imaging pixels. The binning readout circuitry is coupled with the image sensor array to read out the groups of imaging pixels using pixel binning to generate N downsampled HDR sub-frames, each having a respective RGB capture frame and a respective L capture frame, N being an integer greater than 1. The sensor controller is configured to generate each of the N downsampled HDR sub-frames by: directing, over a respective exposure window, sequential exposing of each group of imaging pixels of the image sensor array to incident illumination for a respective exposure time associated with the downsampled HDR sub-frame; and directing, over a respective readout window, sequential reading out of each group of imaging pixels by the binned readout circuitry, such that each group of imaging pixels is read out immediately after the group of imaging pixels is exposed to the incident illumination for the respective exposure time, and such that the pixel binning results, at an end of the respective readout window with the respective RGB capture frame and the respective L capture frame for the downsampled HDR sub-frame. The upsampling engine is coupled with the binning readout circuitry to generate a N luminance-enhanced output images by, for each downsampled HDR sub-frame, applying luminance-guided interpolation to the respective RGB capture frame based on the L capture frame. The HDR engine is to generate a single HDR output image by digitally combining the N luminance-enhanced output images.

Additional features and advantages will be apparent to those skilled in the art upon reading the following detailed description and the accompanying drawings.

BRIEF DESCRIPTION OF THE DRAWINGS

The accompanying drawings form a part of the present disclosure that describe exemplary embodiments of the present invention. The drawings together with the specification will explain the principles of the invention.

FIGS. 2A-2D show examples of such non-Bayer red-green-blue-luminance (RGBL) color filter arrays (CFAs), according to various embodiments described herein.

Figure 1:
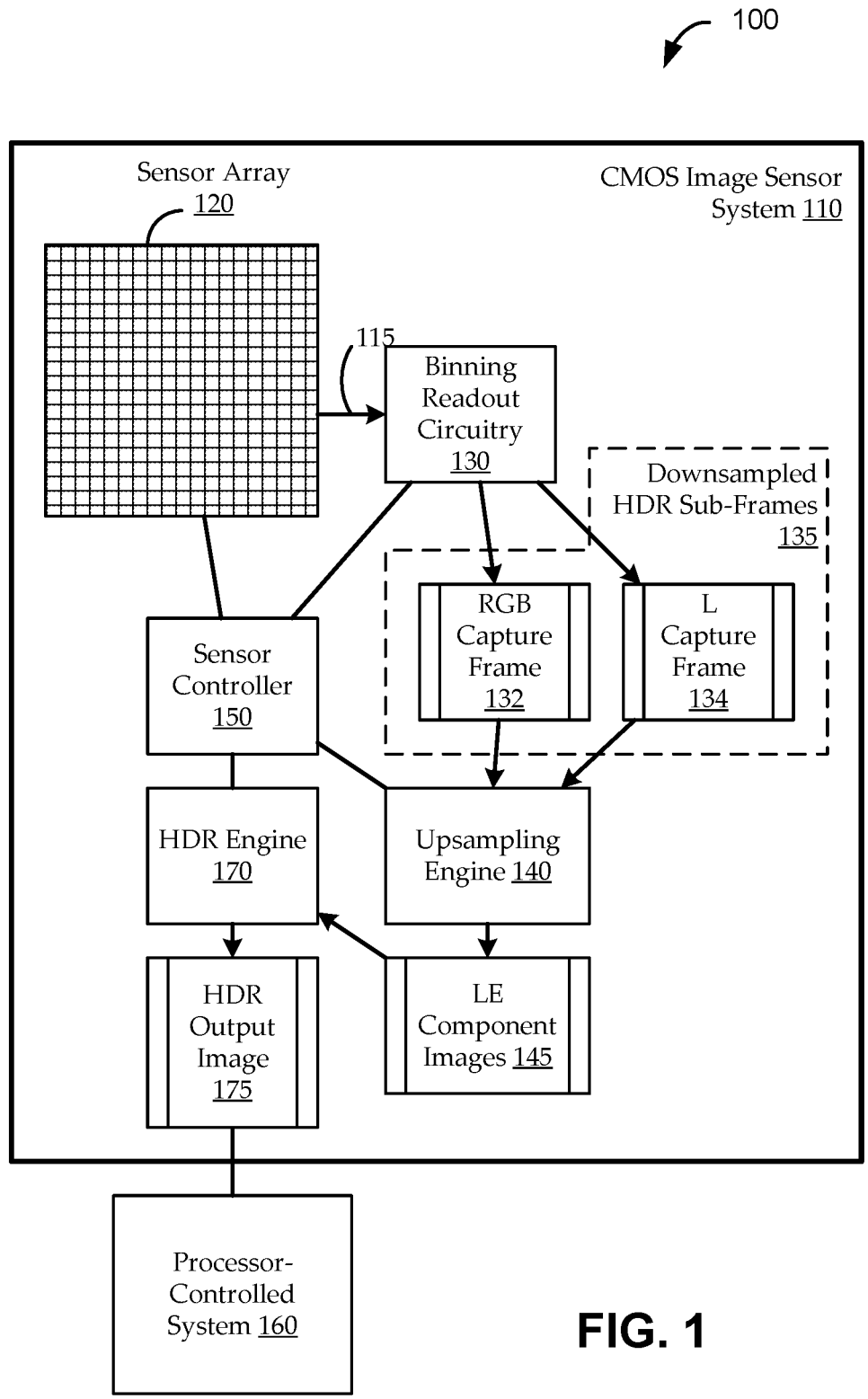
FIG. 1 shows a block diagram is shown of an imaging sensor environment as context for various embodiments described herein.

In the appended figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION OF THE INVENTION

In the following description, numerous specific details are provided for a thorough understanding of the present invention. However, it should be appreciated by those of skill in the art that the present invention may be realized without one or more of these details. In other examples, features and techniques known in the art will not be described for purposes of brevity.

Electronic devices that include high-performance image sensors have become ubiquitous, and consumers are demanding ever-increasing resolutions for those image sensors. While such image sensor designs continue to drive toward high pixel counts and image resolutions, implementation of such features typically competes with other desired design features and constraints, such as high frame rates, low read noise, minimal power consumption, etc. For example, it is desirable in many imaging contexts to provide high dynamic range (HDR) to support high quality image capture in a large range of lighting conditions and/or of scenes having high variations in brightness. However, in many modern applications, such as for small-footprint image sensors integrated in smart phones and/or other portable consumer electronic devices, dynamic range can be intrinsically limited due to the drive for continually shrinking image sensor pixel sizes.

Among various types of conventional approaches to achieve greater dynamic range, some acquire multiple sub-frames in each image acquisition frame, where each sub-frame is associated with a different exposure time. For example, longer exposure times can provide improved performance in low-light conditions by allowing the photo-sensors in the image sensor more time to accumulate photocharge, and shorter exposure times can provide improved performance in bright conditions by avoiding saturating the photo-sensors with excessive exposure. The multiple sub-frames with different exposure times can be captured and digitally combined to create a single output image. With such conventional approaches, dynamic range can be increased by the ratio of maximum and minimum exposure times. However, capturing multiple sub-frames takes more time, any objects moving during the image capture operation will cause blurring and/or can appear in different locations in the frames with different exposure times. This can manifest as image defects and/or artifacts in the output image generated by digitally combining the multiple sub-frames.

Various conventional approaches seek to reduce such image defects and artifacts, but those conventional approaches tend to remain limited at least by readout timing. For example, in high-resolution image sensors with very high pixel counts (e.g., tens of millions of photo-sensors), reading out each individual pixel in every image capture frame may consume excessive amounts of time and power. Capturing multiple sub-frames at different exposure times for each image capture frame further increases the already excessive consumption of time and power resources.

Figure 7:
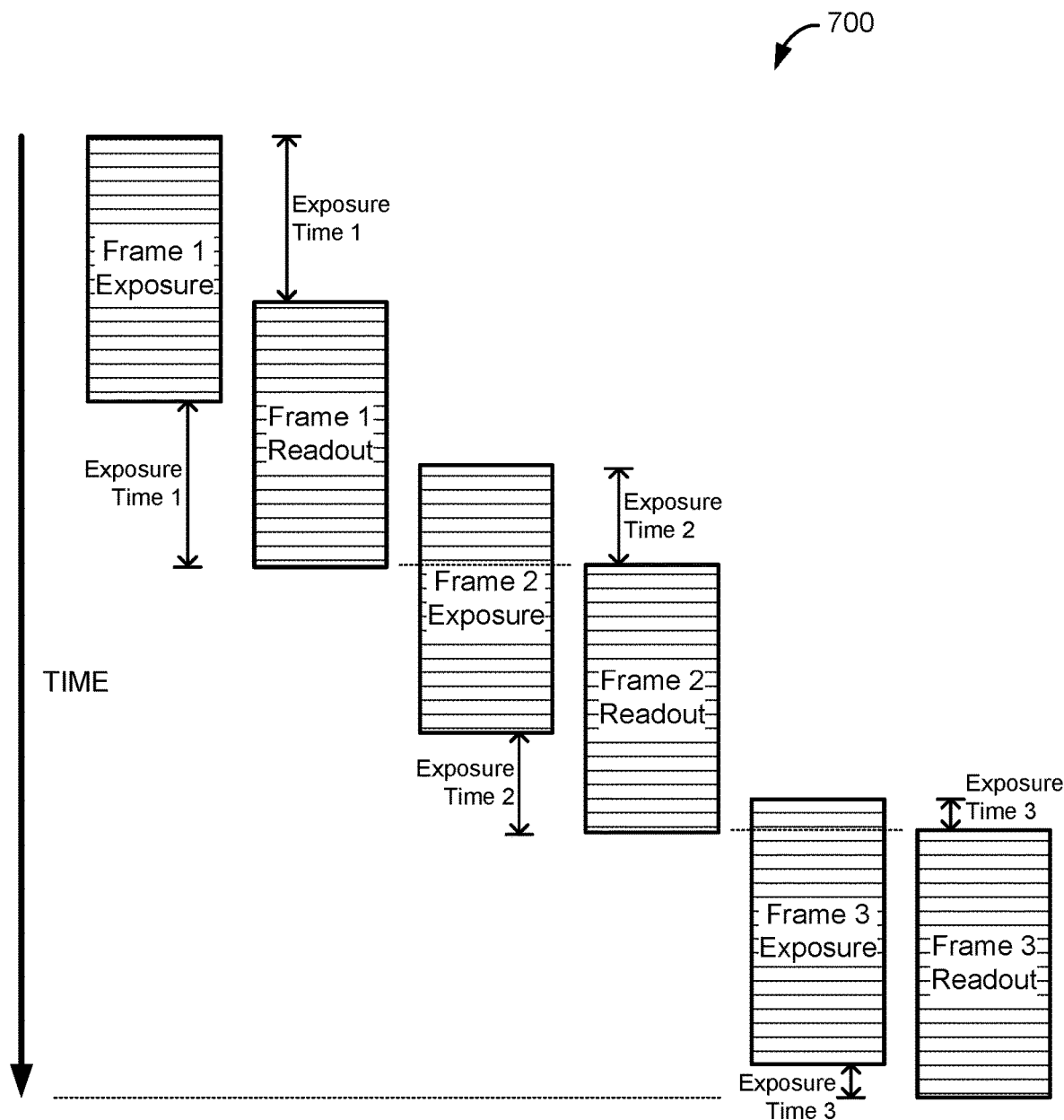
FIG. 7 shows an illustrative timing diagram representation of a conventional multi-frame high-dynamic-range (HDR) approach.
Figure 8:
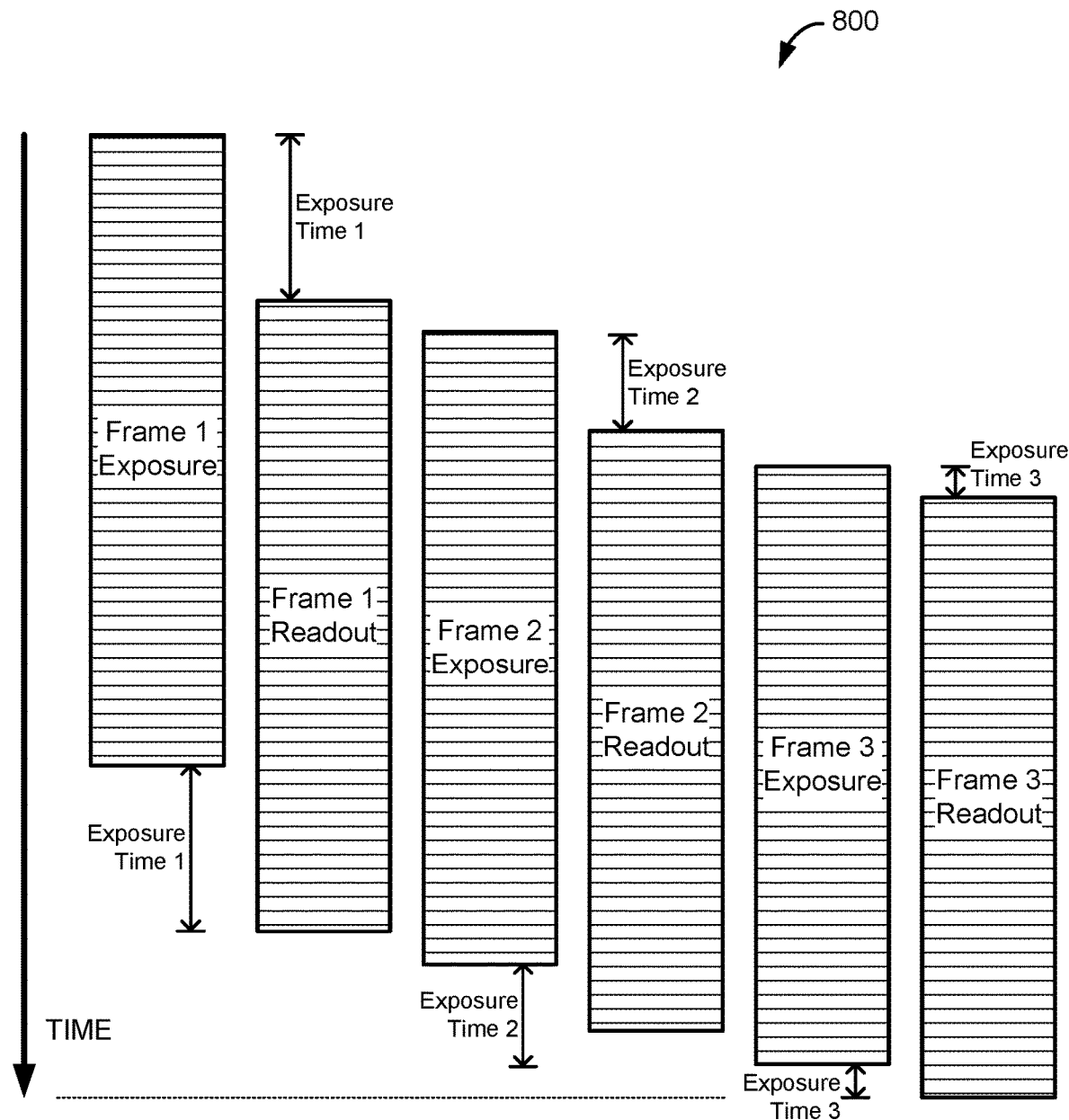
FIG. 8 shows a flow diagram representation of a conventional staggered HDR approach to mitigate certain limitations of multi-frame HDR.

For the sake of context, FIGS. 7 and 8 provide representations of two different conventional HDR approaches. FIG. 7 shows an illustrative timing diagram 700 representation of a conventional multi-frame HDR approach. In the diagram 700, the vertical dimension generally represents time, and the horizontal dimension generally represents an array width. As illustrated, in multi-frame HDR approaches, multiple sub-frames are captured and read out in series, each with a respective exposure time. During a "Frame 1 Exposure" window, photo-sensors of the array are exposed, row by row.

As used herein, a photo-sensor is considered to be "exposed" to incident illumination when it is in a state where it is accumulating photocharge for subsequent read out for image capture purposes. Practically, incident illumination may be permitted to reach the entire image sensor array during the entire Frame 1 Exposure window (e.g., a physical shutter may be fully open), but only a portion of the photo-sensors of the array may be configured as "exposed" to that incident illumination at any particular time during the Frame 1 exposure window. For example, circuitry can be used either to hold a photo-sensor in state in which it does not accumulate photocharge until the start of its intended exposure, to reset the photo-sensor so that any accumulated photocharge is purged prior to the start of its intended exposure, or otherwise to selectively configure the photo-sensor so that it is effectively not "exposed" to illumination until the start of its intended exposure, even if illumination is incident on the photo-sensor.

In effect, the readout speed of the readout circuitry defines the minimum duration of the Frame 1 Exposure and Frame 1 Readout windows. For example, a high-pixel-count array may have thousands of rows. If all rows of the array started to be exposed at the same time (i.e., if the height of the Frame 1 Exposure time corresponded to a single row time), the last rows of the array would have to remain exposed for much more than Exposure Time 1 while waiting for the readout circuit to read out thousands of preceding rows.

In the multi-frame HDR approach, the second readout window ("Frame 2 Readout") cannot begin until the Frame 1 Readout window ends, and the third readout window ("Frame 3 Readout") cannot begin until the Frame 2 Readout window ends. For example, the readout circuitry reads through all the rows of the array in each readout window, then starts over at the first row of the array for the next readout window. As illustrated, each subsequent exposure window can begin prior to the end of the preceding readout window. For example, the Frame 2 Exposure window can begin prior to the end of the Frame 1 Readout window (i.e., the first rows of the array can be reset and can begin to be re-exposed, while the last rows of the array are still in their first exposure time). However, the start of the exposure window must precede the start of its corresponding readout window by its corresponding exposure time, and not before. For example, the Frame 2 Exposure window precedes the start of the Frame 2 Readout window by precisely Exposure Time 2. Consequently, the earliest start time for the Frame 2 Exposure window is Exposure Time 2 before the end of the Frame 1 Readout window (or slightly after to account for setup times and/or other practical considerations).

The readout time generally depends on the readout circuitry, the number of rows of the array, and the width of each row; not on the exposure time. As such, the readout windows have the same duration for all sub-frames, and the total image capture time is bounded at least by a product of the number of sub-frames and the full array readout time. For example, in the illustrated case, with three sub-frames, the total image capture time is at least three times the full array readout time. As an example, suppose the readout circuitry has a sub-frame readout time of 30 milliseconds (ms). To implement multi-frame HDR with three sub-frames having respective exposures of 10 ms, 1 ms, and 100 microseconds, the total image capture time for all three frames would take at least 90 ms.

For any particular row of the array in such an example, the timing would be as follows: 10 ms exposure (Exposure Time 1 during the Frame 1 Exposure window), 20 ms wait time (for Frame 1 Readout), 1 ms exposure (Exposure Time 2 during the Frame 2 Exposure window), 29 ms wait time (for Frame 2 Readout), and 100 us (Exposure Time 3 during the Frame 3 Exposure window). For any particular row, more than 60 ms elapses between the start of exposure in the first sub-frame and the start of readout in the third sub-frame. Any motion of scene objects during such long image capture times can produce various image defects and artifacts.

FIG. 8 shows a flow diagram 800 representation of a conventional staggered HDR approach to mitigate certain limitations of multi-frame HDR. As in FIG. 7, in the diagram 800, the vertical dimension generally represents time, and the horizontal dimension generally represents an array width. To facilitate comparison with FIG. 7, the flow diagram 800 represents a similar case of performing HDR with three sub-frames, each having a respective exposure time. Unlike in FIG. 7, where the readout windows occur in series without any overlap, the staggered HDR approach shown in FIG. 8 has overlapping readout windows.

For example, during a "Frame 1 Exposure" window, photo-sensors of the array are exposed, row by row. After some "Exposure Time 1", row-wise readout of the array begins. The readout of this first sub-frame takes some amount of time, defining the height of the "Frame 1 Readout" window, and also of the Frame 1 Exposure window, as described with reference to FIG. 7. The readout circuit can be configured so that readout of each subsequent sub-frame (e.g., the "Frame 2 Readout" window) begins while the readout of one or more preceding sub-frames (e.g., the Frame 1 Readout window) is still occurring, such that the readout is "staggered." Such staggered readout can be implemented in various ways, such as using parallelization in the readout circuitry.

Some conventional staggered HDR approaches time-interleave frames on a row-by-row basis, or on a small group of rows. As such, less time may elapse between the start of exposure in a first sub-frame for any particular row and the start of readout in a final sub-frame for that particular row, which can allow any motion artifact on any given row to see the benefit of the staggered HDR operation. Typically, however, such interleaving results in the readout time for any particular row being increased by a factor corresponding to the number of sub-frames. For example, regardless of the amount of overlap between the readout frames, in the illustrated case, the same row is being read out three times by the same readout circuit, which effectively increases the width of the array by a factor of three. Comparing FIGS. 7 and 8, it can be seen that the readout windows in FIG. 8 are approximately three times taller than those of FIG. 7.

One consequence of the increase in sub-frame readout window duration is that the total image capture time may not be appreciably improved. Though any particular readout window can start sooner in the staggered HDR context, as compared to the multi-frame HDR approach, each readout window is also considerably longer in duration. For example, comparing FIGS. 7 and 8 again, it can be seen that the total time (i.e., the total length of the arrow labeled "Time") is the same. Another consequence of the increase in sub-frame readout time is that, while motion artifacts in a single row can be minimized, each sub-frame takes longer to read out. For example, each sub-frame readout time can now correspond to the rolling shutter aperture of the imaging system, which increases the top-to-bottom readout time and can produce (or exacerbate) other motion artifacts and defects. As such, conventional staggered HDR can provide better dynamic range with fewer motion artifacts, as compared to a simple multi-frame HDR approach; but it still tends to produce more motion artifacts than a standard single-frame (i.e., non-HDR) image capture approach.

As described above, a limitation of conventional HDR is that readout of multiple sub-frames for each image capture window increases total readout time for the image capture widow, which can manifest as motion-related image artifacts and defects. Indeed, various conventional techniques can be used to reduce the sub-frame readout times, such as by reducing the resolution of the image sensor. For example, some high-performance image sensors use conventional downsampling techniques to reduce the amount of data being read out of the sensor array in each readout window. While such an approach can yield more efficient readout (e.g., faster, lower power, etc.), such an approach also decreases the resolution of the output image. In theory, advanced image processing algorithms can be used to scale up the resolution of a reduced-resolution image. Conventional techniques tend to rely heavily on computationally intensive neural nets, or similar types of algorithmic structures. At least because these techniques tend to take more time to perform resolution up-scaling than it generally takes the image sensor to generate an image, the techniques are typically performed 'offline' (i.e., separate from the image sensor path and subsequent to image capture and output by the image sensor). For example, if a mobile phone can use these types of techniques to generate an up-scaled image of a single image frame in a few seconds or even longer, such a capability may be useful for high-quality photography applications, or to apply digital zoom or image resolution enhancements to images that were previously captured and output from the image sensor (i.e., as a post-editing feature, or the like). However, these types of techniques tend to be impractical or infeasible for real-time applications, such as real-time up-scaling of images or videos (as they are being captured and produced), real-time upscaling of image preview modes, etc. Even if a computational engine could be implemented to support such real-time up-scaling using conventional techniques, such a device would likely consume more power and/or other resources than simply generating the higher resolution image natively in the image sensor itself. As such, using conventional techniques could potentially reduce sub-frame readout times for HDR, but would also tend to result in reduced image quality of each HDR sub-frame (and thereby for the final output image), and/or other reductions in performance. Because the purpose of providing HDR features in an imaging system is typically to support high-quality, high-performance image capture (e.g., over a large range of lighting conditions), application of such conventional techniques would tend to be incompatible with the provision of HDR features.

Embodiments described herein provide a novel type of staggered high-dynamic-range (HDR) image capture in which downsampled readout followed by luminance-guided upsampling appreciably reduces readout times and associated artifacts and defects, while preserving high-resolution image data across color planes. For example, the image sensor is configured according to a red-green-blue-luminance (RGBL) color filter array (CFA) pattern. In each image capture time window, multiple (e.g., three) luminance-enhanced (LE) component images are generated. Each LE component image is generated by exposing the image sensor to incident illumination for a respective amount of time, using pixel binning during readout to generate appreciably downsampled color and luminance capture frames, generating an upsampled luminance guide frame from the luminance capture frame, and using the upsampled luminance guide frame to guide upsampling (e.g., and remosaicking) of the color capture frame. The resulting LE components images can be digitally combined to generate an HDR output image.

Turning to FIG. 1, a block diagram is shown of an imaging sensor environment 100 as context for various embodiments described herein. The imaging sensor environment 100 is illustrated as including a complementary metal-oxide semiconductor (CMOS) imaging sensor (CIS) system 110 in communication with a processor-controlled system 160. The imaging sensor environment 100 may be used to implement a digital imaging system in any suitable application context. For example, the CIS system 110 and processor-controlled system 160 can be implemented in a smartphone, digital camera, wearable device, implantable device, laptop computer, tablet computer, electronic reader, Internet of things (IoT) appliance, or any other suitable context. The processor-controlled system 160 is intended generally to represent any suitable system or systems to provide any suitable features of the imaging sensor environment 100, other than those of the CIS system 110. For example, in a smart phone, the processor-controlled system 160 can include subsystems for providing telephonic and communications features, display features, user interaction features, application processing features, etc.

As illustrated, the CIS system 110 includes a sensor array 120, binning readout circuitry 130, and an upsampling engine 140. Timing, signaling, and/or other features of components of the CIS system 110 are controlled by a sensor controller 150. The sensor controller 150 can include any suitable processors and/or circuits for directing operation of the CIS system 110 components and interfacing with other systems (e.g., processor-controlled system 160). Some implementations of the sensor control circuit 150 are implemented as, or include a companion integrated circuit (IC) having integrated interface components, storage components, and processing components. For example, the processing components of the sensor control circuit 150 can include one or more central processing units (CPUs), application-specific integrated circuits (ASICs), application-specific instruction-set processors (ASIPs), graphics processing units (GPUs), physics processing units (PPUs), digital signal processors (DSPs), field-programmable gate array (FPGAs), programmable logic devices (PLDs), controllers, microcontroller units, reduced instruction set computer (RISC) processors, complex instruction set computer (CISC) processors, microprocessors, or the like, or any combination thereof A basic function of the sensor array 120 is to capture photons and convert them into electrons using photo-sensors. Thus, the sensor array 120 is implemented as an array of any suitable photo-sensors. For example, each photo-sensor can be implemented as a single photodiode, or as a set of photodiodes (e.g., multiple photodiodes sharing a common floating diffusion node). In some cases, the sensor array 120 is a high-pixel-count array, such as a 48 Megapixel array. Each photo-sensor in the sensor array 120 generates a sensor output level responsive to exposure to incident illumination. For example, while the sensor array 120 is exposed to light during an integration time window, the photo-sensors accumulate an amount of photocharge that corresponds to an intensity of illumination it receives. At the end of the integration time window, the amount of photocharge accumulated by the photo-sensor manifests as the photo-sensor's sensor output level.

Each photo-sensor in the sensor array 120 is optically integrated with optics, including a respective color filter that is permissive to light energy in one or more frequency bands. For example, a photo-sensor integrated with a "red" color filter will receive light in the red color band permitted by the color filter, such that the sensor output level generated by that photo-sensor will indicate a received intensity of red light at the corresponding location in the sensor array 120. The array of color filters optically integrated with the array of photo-sensors is arranged according to a pattern, referred to as a color filter array (CFA) pattern, or simply as a CFA. Terms, like "imaging pixel," or "image sensor pixel," are used herein to refer to a particular imaging location in the sensor array 120, which corresponds to light received by a corresponding photo-sensor via a corresponding color filter.

Many conventional CFAs implement patterns of red (R), green (G), and blue (B) color filters, where each filter color can be considered as a color plane with reduced density. For example, a typical Bayer RGB CFA can be arranged with 50% G imaging pixels, 25% B imaging pixels, and 25% R imaging pixels. Some conventional CFAs have sought to adapt the CFA for increased luminance response. For example, it has been found that yellow (Y) imaging pixels, or white (W) imaging pixels tend to provide increased luminance information. As such, some conventional designs sought to modify Bayer patterns by replacing G imaging pixels with higher-luminance Y or W imaging pixels (e.g., to form a RYYB CFA, or a RWWB CFA). However, such designs have tended to be unsuccessful at least because the large difference in luminance between adjacent imaging pixels for any particular light condition tended to yield poor response characteristics (e.g., signal-to-noise ratio, pixel conversion gain, etc.) across the array.

Embodiments described herein use non-Bayer color patterns that include various densities of luminance (L) imaging pixels in addition to RGB imaging pixels. Such CFAs are referred to herein as RGBL CFAs. In some implementations, the L imaging pixels (of any of the different RGBL CFAs described herein) are implemented as W imaging pixels, such that the CFAs follow an RGBW pattern. The luminance pixels can be used primarily to capture broad-spectrum luminance (e.g., light intensity) information, rather than particular color information.

Figures 2A, 2B, 2C, 2D:
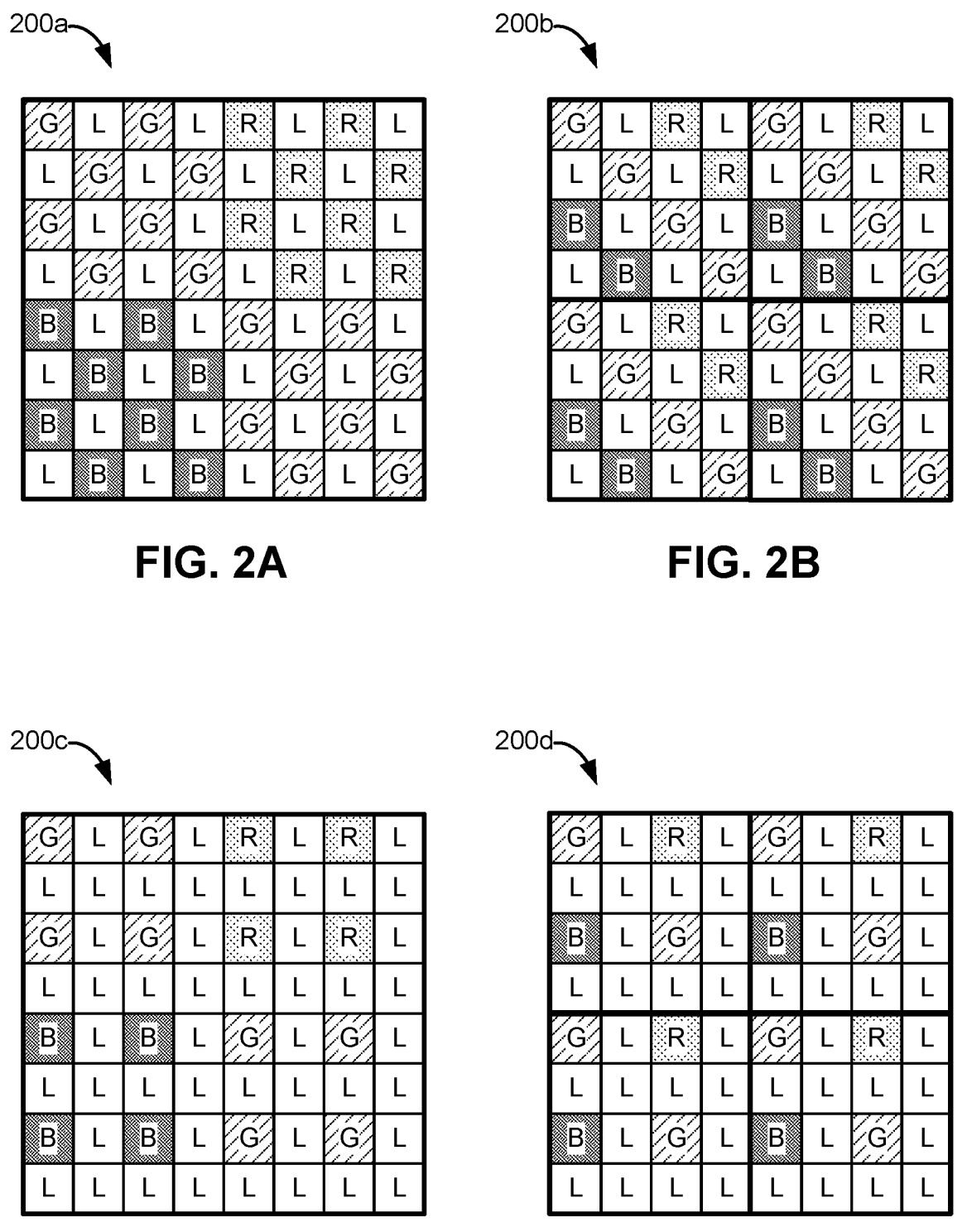

FIGS. 2A-2D show examples of such non-Bayer RGBL CFAs 200, according to various embodiments described herein. FIG. 2A shows a first RGBL CFA implemented as so-called "hexa-deca RGBL" CFA. Such a CFA includes repeating 8-by-8 subarrays of imaging pixels, each with an equal distribution of L imaging pixels and RGB imaging pixels. In particular, each subarray (of 64 imaging pixels) includes 32 RGB imaging pixels (16 G imaging pixels, 8 R imaging pixels, and 8 B imaging pixels), with 32 L imaging pixels evenly interspersed in a checkerboard pattern. FIG. 2B shows a second RGBL CFA implemented as so-called "Quad RGBL" CFA. Such a CFA includes repeating 4-by-4 subarrays of imaging pixels, each also having an equal distribution of L imaging pixels and RGB imaging pixels. In particular, each subarray (of 16 imaging pixels) includes 8 RGB imaging pixels (4 G imaging pixels, 2 R imaging pixels, and 2 B imaging pixels), with 8 L imaging pixels evenly interspersed in a checkerboard pattern. It can be seen that in both the hexa-deca RGBL CFA of FIG. 2A and the Quad RGBL CFA of FIG. 2B, half of all the pixels in each subarray are L imaging pixels. Such a distribution is referred to herein as having 50-percent luminance density (or L density).

FIGS. 2C and 2D show RGBL CFAs with 75-percent luminance density. FIG. 2C shows a third RGBL CFA implemented as so-called "sparse hexa-deca RGBL" CFA. Such a CFA is similar to the hexa-deca RGBL CFA of FIG. 2A, except that every other row is only L imaging pixels. As such, each subarray (i.e., each 8-by-8 subarray of 64 imaging pixels) includes 48 L imaging pixels interspersed with 16 RGB imaging pixels (8 G imaging pixels, 4 R imaging pixels, and 4 B imaging pixels). FIG. 2D shows a fourth RGBL CFA implemented as so-called "sparse Quad RGBL" CFA. Such a CFA is similar to the Quad RGBL CFA of FIG. 2B, except that every other row is only L imaging pixels. As such, each subarray (i.e., each 4-by-4 subarray of 16 imaging pixels) includes 12 L imaging pixels interspersed with 4 RGB imaging pixels (2 G imaging pixels, 1 R imaging pixel, and 1 B imaging pixel). The sparse hexa-deca RGBL CFA of FIG. 2C and the sparse Quad RGBL CFA of FIG. 2D are referred to as 75-percent luminance density CFAs herein because three-quarters of the imaging pixels in each of their respective subarrays are L imaging pixels.

Though embodiments are described herein with reference to specific CFA patterns, novel techniques described herein can be applied to any suitable type of CFA pattern that interleaves a sufficiently high density of L imaging pixels with color imaging pixels. For example, specific references herein to red, green, and blue color planes are intended only to exemplify a set of possible implementations; and some or all of those color planes can be replaced by other color planes to be interleaved with the L imaging pixels. As one example, embodiments described herein can be applied to CFA patterns that interleave cyan, magenta, and/or yellow color planes with a high density of L imaging pixels.

Returning to FIG. 1, the CIS system 110 can be used to produce an image (e.g. a single image, one of a burst of sequential images, a frame of a video, etc.) in an imaging time window. For example, each imaging time window can include at least an integration time window, a readout time window, and an upsampling time window. During the integration time window, the sensor array 120 is exposed to incident illumination (e.g., and during which shutters, focusing optics, and/or other components are controlled to facilitate such exposure). In response to such exposure, each imaging pixel accumulates photocharge in an amount relative to the respective intensity of illumination received by the corresponding photo-sensor of the imaging pixel via the respective color filter of the imaging pixel. The respective amount of accumulated photocharge for each imaging pixel manifests as respective sensor output level.

As noted above, reading out every individual sensor output level at full resolution, particularly for a high-pixel-count sensor array 120, can consume an excessive amount of power, time, and/or other resources. As such, it can be desirable to downsample the sensor array 120 output during readout. Embodiments of the sensor controller 150 direct the binning readout circuitry 130 to readout the respective sensor output levels with pixel binning. The pixel binning can be performed in any suitable manner that: (a) combines the respective sensor output levels from adjacent imaging pixels of a same color to produce a reduced number of binned sensor output levels; and (b) results in a separate downsampled RGB capture frame 132 and downsampled L capture frame 134 for each sensor array 120 readout widow. In some implementations, groups of imaging pixels are coupled with a same floating diffusion node to be read out via a same source follower path. Such implementations can be referred to as "charge binning" and can result in an additive combination of adjacent same-color sensor output levels. In other implementations, each imaging pixel is coupled with a respective floating diffusion node and source follower path, and the source follower paths drive a common readout line to result in an averaging combination of adjacent same-color sensor output levels.

Figure 3:
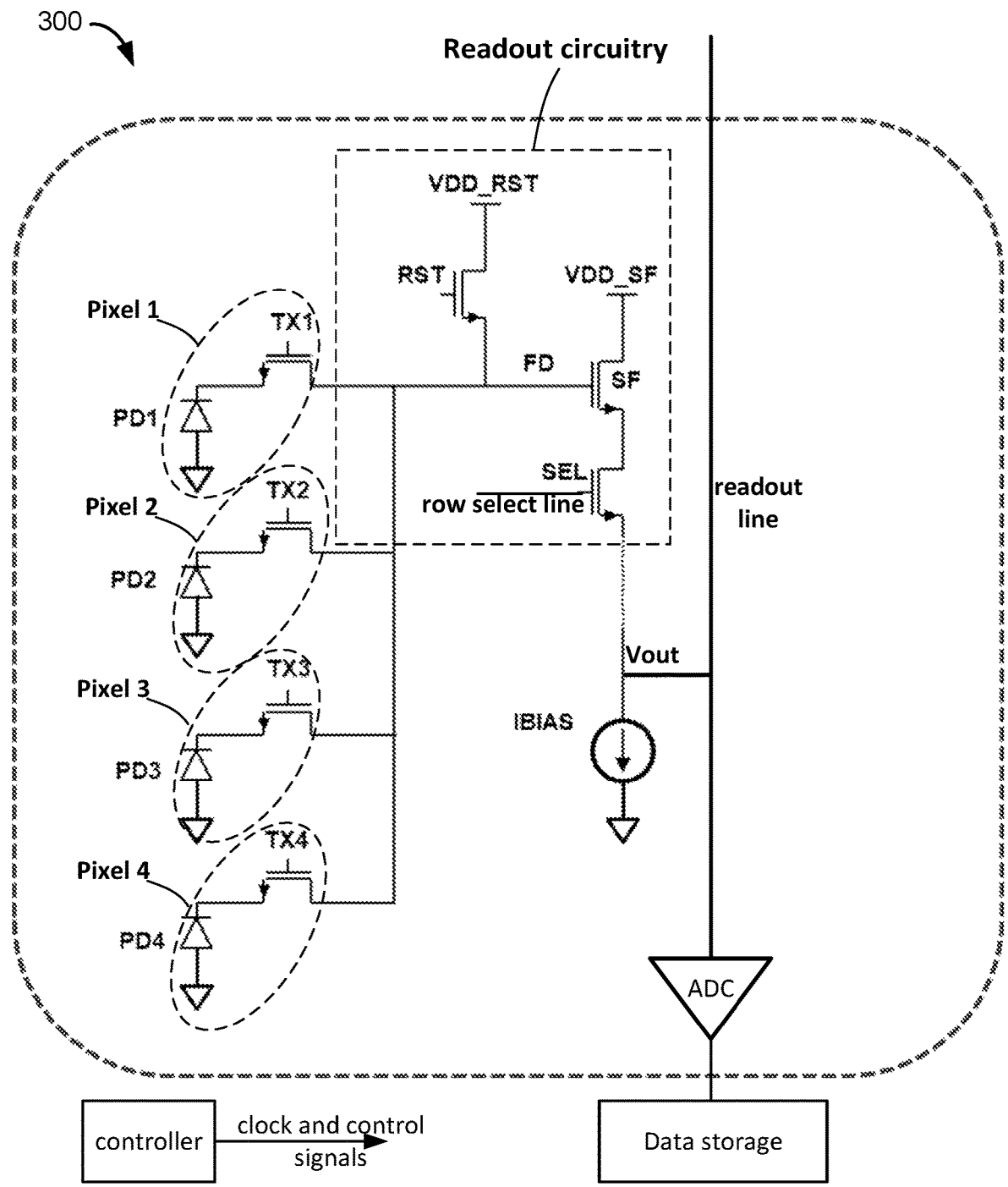
FIG. 3 shows an example circuit that includes a set of imaging pixels and illustrative readout circuit configured to perform charge binning of the outputs of the imaging pixels.

For example, FIG. 3 shows an example circuit 300 that includes a set of imaging pixels and illustrative readout circuit configured to perform charge binning of the outputs of the imaging pixels. The illustrated readout circuitry can be an implementation of the binning readout circuitry 130 of FIG. 1. As illustrated, the readout circuitry can include at least one reset (RST) device, source follower (SF) device, and select (SEL) device. The pixel charge binning concept is to provide the electron charge from all the photodiodes at one time on a shared floating diffusion node, labeled "FD." In this case, the summation of all the shared imaging pixels can be read out with one analog-to-digital (ADC) operation. This can reduce the total energy to read out the entire array and can reduce the circuit noise applied to the shared pixel cluster, at the expense of reduced resolution. In the illustrated circuit, four imaging pixels are shown as "Pixel 1" through "Pixel 4." Each imaging pixel is illustrated as having a respective a photodiode (PD) coupled with the shared FD node via a respective transfer gate (TX).

Prior to the integration time window, the RST device can be turned on to effectively reset the FD node (e.g., to ground). The photodiodes can also be reset by turning ON the transfer gates while turning on the RST device. During the integration time window, the transfer gates are OFF, and the photodiodes accumulate photocharge. Upon completion of the integration time window, the accumulated photocharge can be read out. For example, in a readout time window, turning ON any of the transfer gates can cause the accumulated photocharge of the corresponding photodiode to transfer onto the FD node. Similarly, concurrently turning on all of the transfer gates can cause the accumulated photocharge of all of the photodiodes to transfer in an aggregated (e.g., summed) fashion onto the FD node.

The SF device is disposed between a source follower voltage (VDD_SF) and the SEL device, with its gate coupled to the FD node. Thus, the SF device turns allows current to flow in an amount corresponding to the amount of accumulated photocharge from the imaging pixels that has been transferred onto the shared FD node. The SEL device has a gate coupled to a row select line and is disposed between the SF device and a voltage readout line, which is also coupled to a current source (IBIAS). Thus, when the row is selected (i.e., the SEL device is ON), an binned sensor output level (i.e., an analog output voltage signal, VOUT) develops at the voltage readout line to correspond to the amount of aggregated accumulated photocharge transferred to the FD node. This analog VOUT signal can be converted to a digital binned pixel value by an analog-to-digital converter ADC for readout via a readout line (e.g., a column readout line). The illustrated devices can be implemented in any suitable manner, such as using NMOS transistors and/or PMOS transistors.

As shown, some implementations include data storage, such as a register or other storage device for storing the read out digital binned pixel value. For example, the storage device can be used to collect the various binned pixel values from across the sensor array 120 to generate the RGB capture frame 132 and the L capture frame 134. A controller is also shown for context. The controller can be implemented by the sensor controller 150 of FIG. 1 to provide any suitable clock signals, control signals, etc. to implement a desired pixel binning scheme. For example, the controller outputs control signals to turn ON or OFF the transfer gates, RST device, SEL device, and/or other components to implement features of the pixel-binned readout.

While the implementation of FIG. 3 shows four imaging pixels being charge-binned, similar techniques can be used with various numbers and/or combinations of pixels. For example, essentially same circuit 300 can be used with two imaging pixels, eight imaging pixels, or any other suitable number of imaging pixels, to the extend supportable by other device components in the circuit 300. Also, the same circuit 300 can be used to charge bin selected subsets of the imaging pixels coupled with a shared FD node. For example, in a rolling shutter type of readout, a first readout cycle can concurrently transfer charge from Pixel 1 and Pixel 2 for readout (i.e., by turning ON TX1 and TX2), and next readout cycle can concurrently transfer charge from Pixel 3 and Pixel 4 for readout (i.e., by turning ON TX3 and TX4).

Figure 4A:
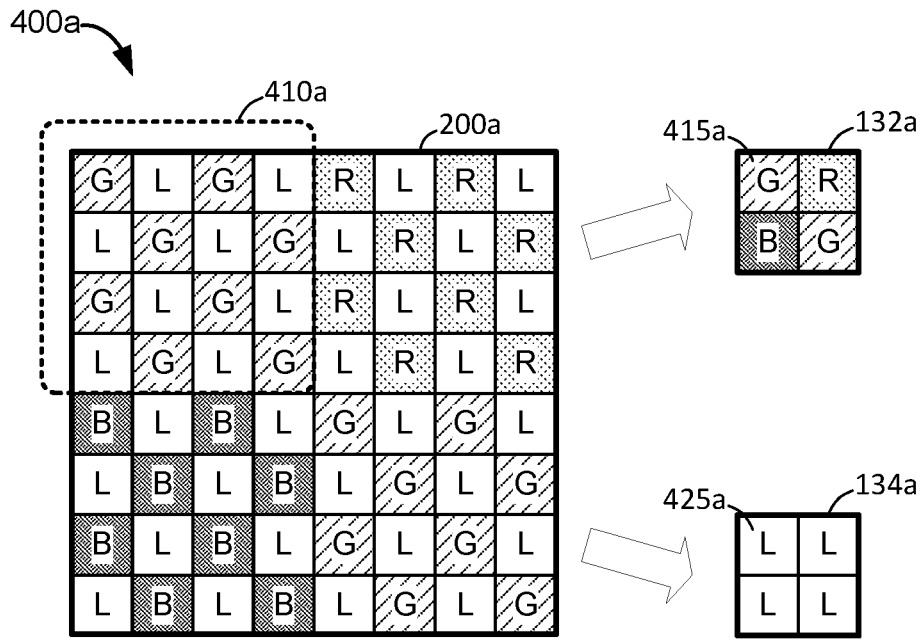
FIGS. 4A-4D show four examples of pixel binning schemes implemented using a the non-Bayer RGBL CFAs of FIGS. 2A-2D, respectively, according to various embodiments described herein.

FIGS. 4A-4D show four examples of pixel binning schemes 400 implemented using a the non-Bayer RGBL CFAs 200 of FIGS. 2A-2D, respectively, according to various embodiments described herein. Turning first to FIG. 4A, the hexa-deca RGBL CFA 200a of FIG. 2A is shown pixel-binned concurrently into a 2-by-2 RGB capture frame 132a and a 2-by-2 L capture frame 134a. This is a type of 4-by-4 pixel binning scheme, such that the resolution is downsampled by a factor of four in both the horizontal and vertical dimensions. For example, an upper-left quadrant of imaging pixels (i.e., 16 of the 64 total imaging pixels) of the hexa-deca RGBL CFA 200a is indicated by a dashed rectangle 410a. The eight G imaging pixels in quadrant 410a are pixel binned (e.g., by charge binning, or other suitable technique) to yield binned pixel 415a in the corresponding quadrant of RGB capture frame 132a, and the eight L (e.g., W) imaging pixels in quadrant 410a are pixel binned (e.g., by the same technique) to yield binned pixel 425a in the corresponding quadrant of L capture frame 134a.

Figure 4B:
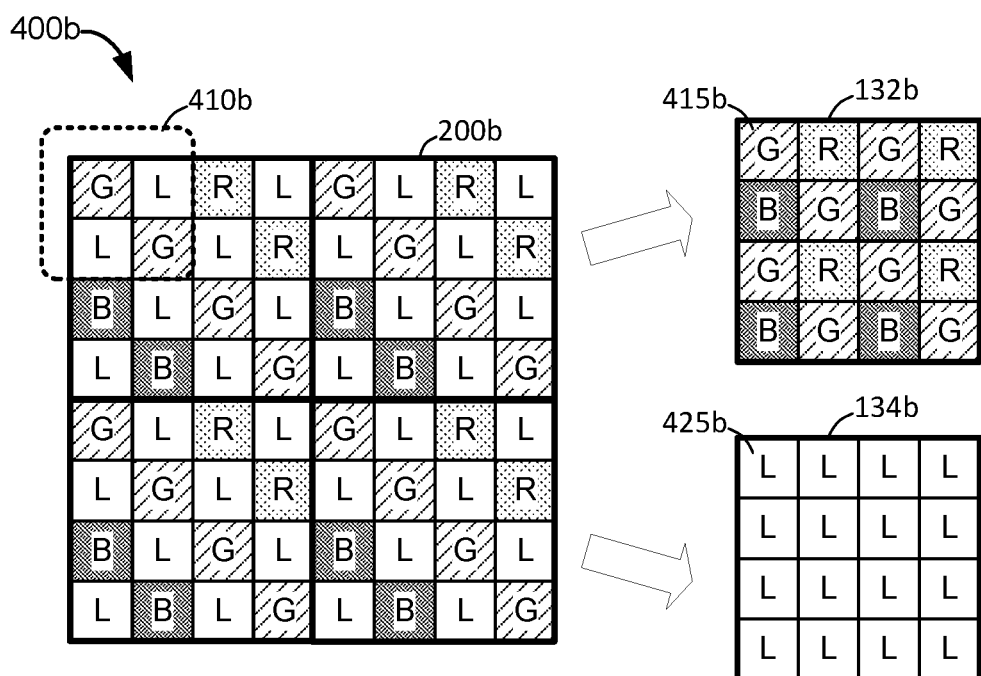

In FIG. 4B, the quad RGBL CFA 200b of FIG. 2B is shown pixel-binned concurrently into a 4-by-4 RGB capture frame 132b and a 4-by-4 L capture frame 134b. This is a type of 2-by-2 pixel binning scheme, such that the resolution is downsampled by a factor of two in both the horizontal and vertical dimensions. For example, an upper-left quadrant of an upper left quadrant of imaging pixels (i.e., 4 of the 64 total imaging pixels) of the quad RGBL CFA 200b is indicated by a dashed rectangle 410b. The two G imaging pixels in quadrant 410b are pixel binned to yield binned pixel 415b in the corresponding position of RGB capture frame 132b, and the two L imaging pixels in quadrant 410b are pixel binned to yield binned pixel 425b in the corresponding position of L capture frame 134b.

Figure 4C:
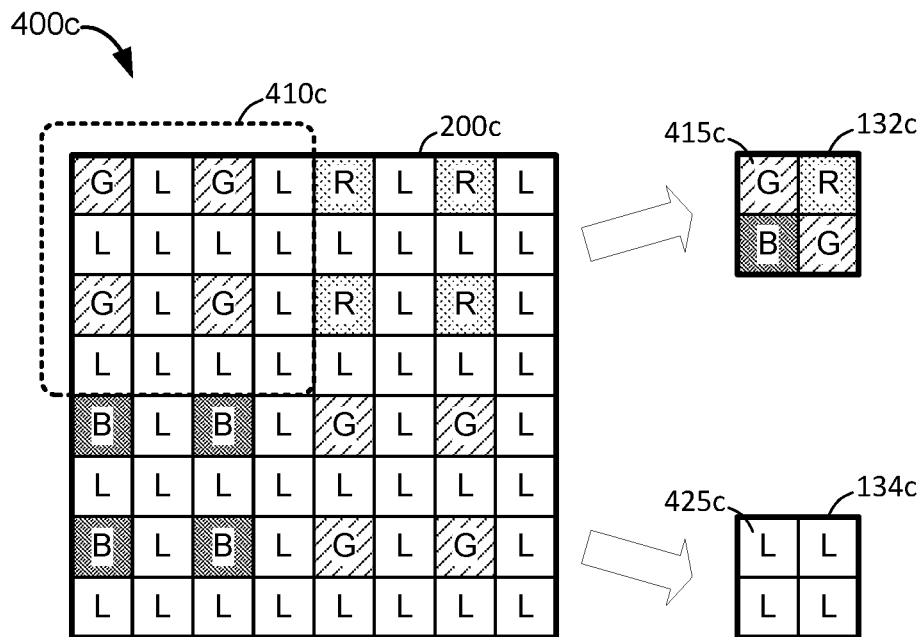

In FIG. 4C, the sparse hexa-deca RGBL CFA 200c of FIG. 2C is shown pixel-binned concurrently into a 2-by-2 RGB capture frame 132c and a 2-by-2 L capture frame 134c. This is another type of 4-by-4 pixel binning scheme, similar to the scheme of FIG. 4A. However, here, the upper-left quadrant 410c includes only four G imaging pixels, but 12 L imaging pixels. The four G imaging pixels are pixel binned to yield binned pixel 415c in the corresponding quadrant of RGB capture frame 132c, and the 12 L imaging pixels in quadrant 410c are pixel binned to yield binned pixel 425c in the corresponding quadrant of L capture frame 134c.

Figure 4D:
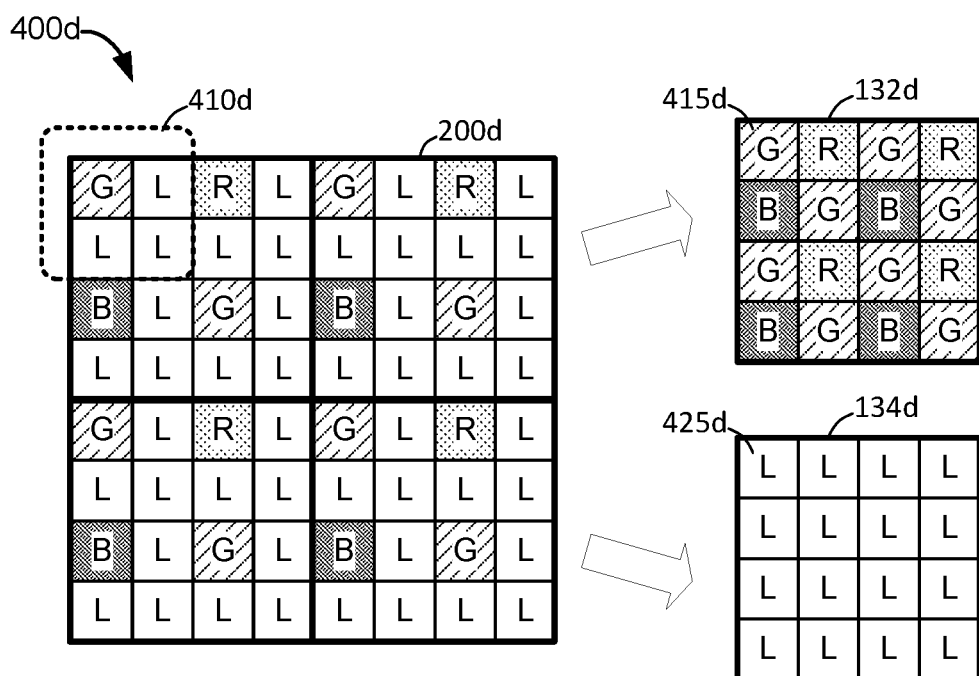

In FIG. 4D, the sparse quad RGBL CFA 200d of FIG. 2B is shown pixel-binned concurrently into a 4-by-4 RGB capture frame 132d and a 4-by-4 L capture frame 134d. This is another type of 2-by-2 pixel binning scheme, similar to the scheme of FIG. 4B. However, here, the upper-left quadrant of the upper left quadrant (the four pixels indicated by dashed rectangle 410d) includes only a single G imaging pixel and three L imaging pixels. In this case, the RGB capture frame 132d is generated without pixel binning, and the three L imaging pixels in quadrant 410d are pixel binned to yield binned pixel 425d in the corresponding position of L capture frame 134d. FIGS. 4A-4D describe only some of the possible pixel binning approaches that can be used with RGBL CFAs. Some other examples of pixel binning approaches that can be used with RGBL CFAs are described in U.S. patent application Ser. No. 17/382,354, titled "PIXEL BINNING FOR HEXA-DECA RGBW COLOR FILTER ARRAYS," filed on Jul. 22, 2021, which is hereby incorporated by reference in its entirety.

Returning again to FIG. 1, the binning readout circuitry 130 performs pixel-binned readout of the sensor output levels from the sensor array 120 during the readout time window of each imaging time window to generate two downsampled capture frames to represent each of multiple downsampled HDR sub-frames 135. The pixel-binned readout can be performed according to a global shutter readout, a rolling shutter readout, or in any other suitable manner to support HDR features, until all the sensor output levels are read out of the sensor array 120 (i.e., as part of a binned set of sensor output levels) for the multiple downsampled HDR sub-frames 135. In some embodiments, as described above, staggered HDR is supported by implementing the pixel-binned readout with row interleaving across exposure sub-frames. In some embodiments, the pixel-binned readout circuitry further includes parallel readout structures to permit concurrent reading of different rows for different exposure sub-frames.

As illustrated, upon completion of the readout time window, a full (downsampled) RGB capture frame 132 and a full (downsampled) L capture frame 134 have been generated by the binning readout circuitry 130 for each downsampled HDR sub-frame 135. In some implementations, each downsampled HDR sub-frame 135 is represented by a separate RGB capture frame 132 and L capture frame 134. In other implementations, the multiple sub-frames can be treated as a single image capture frame across an array of N times the width, where N is the number of sub-frames. In such implementations, a single wide RGB capture frame 132 and wide L capture frame 134 can represent the data for all N downsampled HDR sub-frames 135. As noted above with reference to FIG. 3, the binned pixel values that make up the capture frames can be temporarily stored in any suitable data storage, such as registers or other storage devices integrated with the CIS system 110 (e.g., on the same chip as the binning readout circuitry 130).

Still in the same imaging window (i.e., in the same image sensor output path), embodiments of the sensor controller 150 direct the upsampling engine 140 to generate a luminance-enhanced (LE) component image 145 based on both the RGB capture frame 132 and the L capture frame 134. As described herein, each generated LE component image 145 corresponds to one of the downsampled HDR sub-frames 135. As such, each LE component image 145 is effectively one of multiple sub-frame images associated with one of multiple respective exposure times to support subsequent digital combination into an HDR output image 175. The sensor array 120 has a particular maximum "native" resolution defined at least by the number of imaging pixels. For example, a sensor array 120 with 48 million imaging pixels can be said to have a maximum native resolution of 48 Megapixels. As described above, the downsampled RGB capture frame 132 and L capture frame 134 each have a resolution that is appreciably lower than the maximum resolution of the sensor array 120. For example, if a 2-by-2 pixel binning scheme is applied to a sensor array 120 with a maximum native resolution of R, each of the RGB capture frame 132 and the L capture frame 134 can have a resolution of approximately R/4 (the result may not be exactly R/4, for example, if some imaging pixels at the edges of the sensor array 120 cannot be pixel binned in the same manner as those away from the edges). Similarly, if a 4-by-4 pixel binning scheme is applied to a sensor array 120 with a maximum native resolution of R, each of the RGB capture frame 132 and the L capture frame 134 can have a resolution of approximately R/16. Embodiments of the upsampling engine 140 can generate the LE component image 145 to have any suitable resolution that is greater than that of the downsampled capture frames (i.e., each of the RGB capture frame 132 and the L capture frame 134). In some implementations, the upsampling engine 140 generates the LE component image 145 to have a resolution equal to that of the maximum native resolution of the sensor array 120. In other implementations, the upsampling engine 140 generates the LE component image 145 to have a resolution between that of the downsampled capture frames and the maximum native resolution of the sensor array 120. In other implementations, the upsampling engine 140 generates the LE component image 145 to have a resolution greater than the maximum native resolution of the sensor array 120.

Conventional upsampling approaches tend to be applied to RGB CFAs by interpolating between pixels of a same color plane. However, those pixels are spaced relatively far apart in some CFAs, and interpolation accuracy reduces with greater separation between the measured pixel values. For example, in a conventional Bayer RGB array, each 2-by-2 block of imaging pixels can follow the pattern: {R, G; G, B}. In such a pattern, each R pixel may be separated from any adjacent R pixel (e.g., the R pixel in the right-adjacent block) by a single G pixel. Upscaling such a pattern by a factor of two can yield a 4-by-4 array, such as: {R, ?, G, ?; ?, ?, ?, ?; G, ?, B, ?; ?, ?, ?, ?} (where '?' represents an undefined value of the array). Now, each R pixel is separated from any adjacent R pixel by three pixel locations. Other CFA patterns and/or larger degrees of upscaling yield even greater separation between pixels sharing a color plane. Some other conventional up-sampling approaches applied to conventional CFAs seek to extrapolate between pixels across different color planes. However, such extrapolation across different color planes tends to be unable to distinguish between changes in color and changes in intensity.

Embodiments described herein use non-Bayer RGBL CFAs (e.g., non-Bayer RGBL CFAs 200) to provide an additional luminance plane that spatially corresponds to, but is color-separated from, all RGB color planes. Indeed, introduction of the L plane in the RGBL CFAs reduces the overall resolution of the RGB color planes, as compared to a sensor array of the same native resolution having only RGB pixels. However, the luminance information provided by the dense population of L pixels in the sensor array 120 is felicitous to upsampling at least because of the large amount of light collected by the L imaging pixels relative to the amount collects by the RGB imaging pixels, the ability to differentiate between overall luminance information of the L imaging pixels and color-specific intensity information of the RGB imaging pixels, and the spatial and temporal correspondence between the data captured in the L plane and the data captured in the RGB planes (i.e., because the L imaging pixels and the RGB imaging pixels are in the same sensor array 120 being exposed to the same incident light in the same imaging time window).

Figure 5:
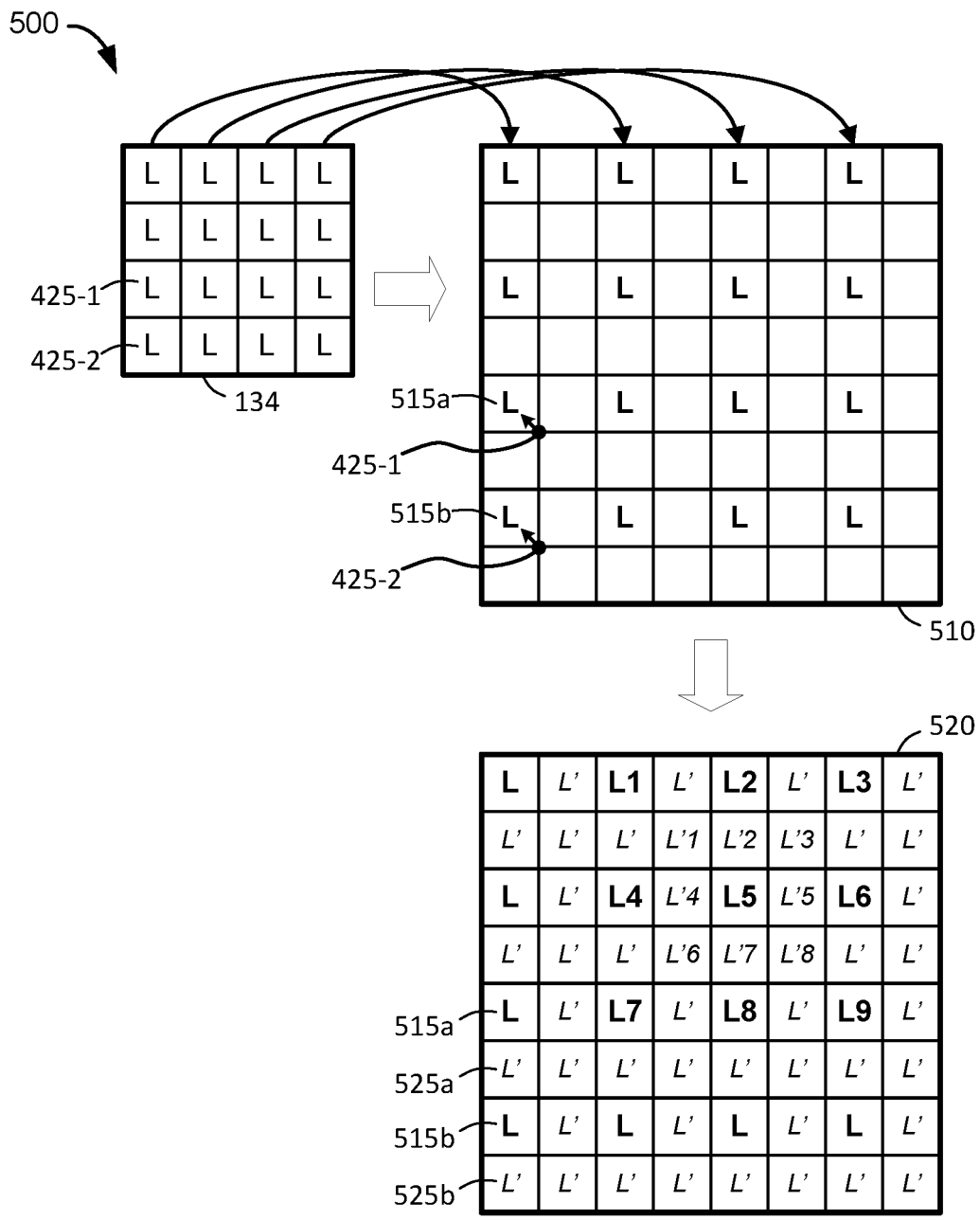
FIG. 5 shows a representative flow diagram of one illustrative stage of generating the LE output image in which a downsampled L capture frame is used to generate an upsampled L guide frame.
Figure 6A:
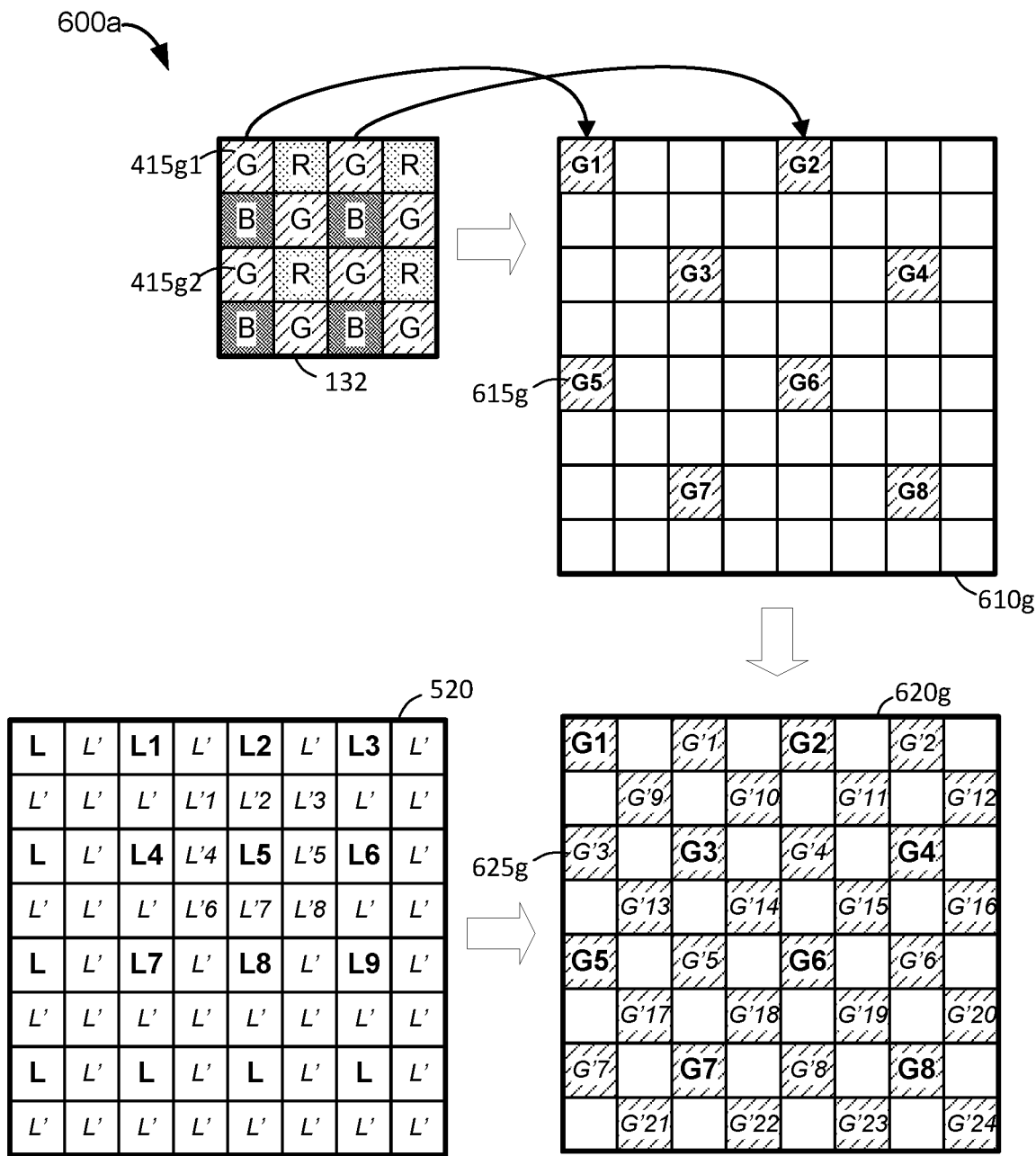
FIGS. 6A-6C show representative flow diagrams of illustrative stages of generating the LE output image in which an upsampled L guide frame is used to provide luminance-guided upsampling of a downsampled RGB capture frame to generate color planes of an upsampled RGB frame.
Figure 6B:
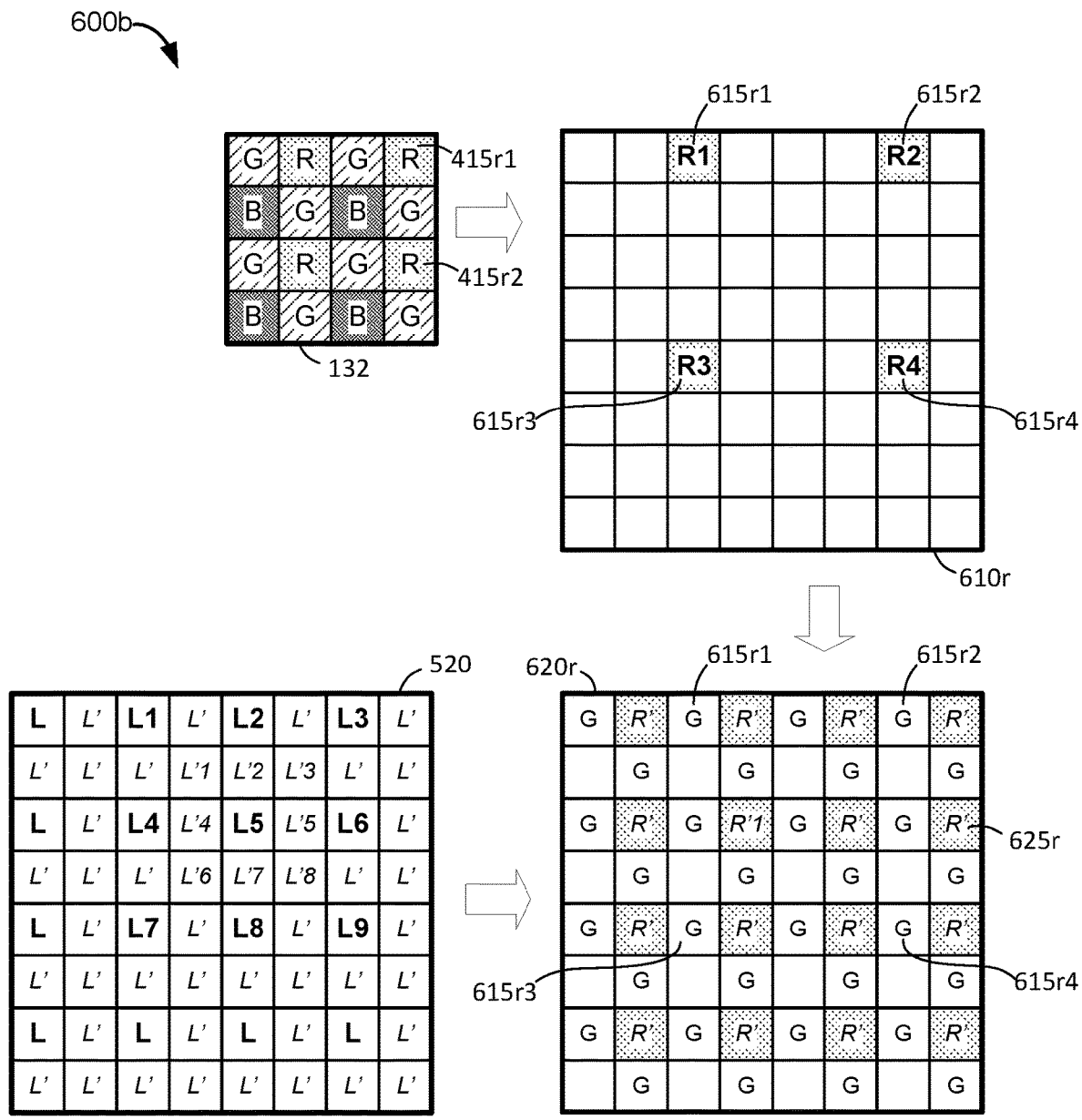
Figure 6C:
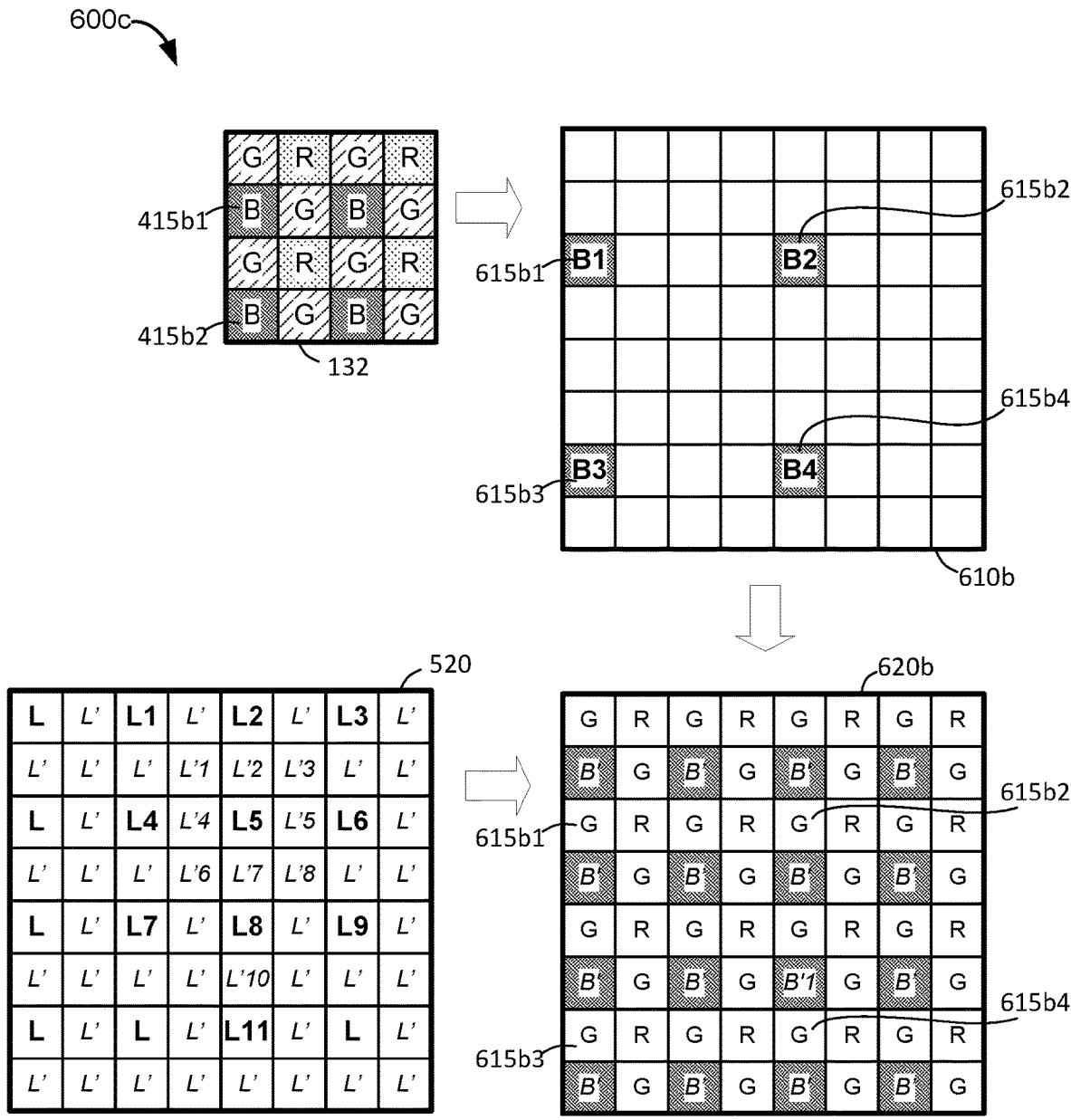

FIGS. 5-6C show representative flow diagrams of an illustrative manner of generating the LE component images 145 by the upsampling engine 140 by using the L capture frame 134 to upsample and remosaic the RGB capture frame 132. In general, the upsampling engine 140 can produce an upsampled L guide frame 520 from the L capture frame 134. A remosaicking operation is performed on each color plane of the RGB capture frame 132 based on the L guide frame 520. The representations of FIGS. 5-6C assume that the pixel binning scheme 200b of FIG. 2B was used to generate the RGB capture frame 132 and the L capture frame 134, but similar techniques can be applied to any other suitable pixel binning scheme.

Turning first to FIG. 5, a first representative flow diagram 500 is shown beginning with the L capture frame 134 (e.g., L capture frame 134b of FIG. 2B). The L capture frame 134 is upscaled to produce an upscaled L frame 510. The upscaled L frame 510 has a size configured to support the target resolution of the LE component image 145 (e.g., which can also be the target resolution of the ultimate HDR output image after digitally combining the LE component images 145), which is larger than (e.g., an integer multiple of) the resolution of the L capture frame 134. As such, the upscaled L frame 510 includes more array locations than the L capture frame 134. As described above, the L capture frame 134 is an array of binned L pixel values 425, each generated by combining information from multiple photosensor outputs. As such, each binned L pixel value 425 approximates the luminance information for a corresponding location in the captured scene (i.e., in the incident illumination to which the sensor array 120 was exposed).

When upscaling, each binned L pixel value 425 can be considered as indicating the luminance information for some point in space that may not correspond to any particular array location (i.e., upscaled L pixel 515) of the upscaled L frame 510. For example, the illustrated upscaled L frame 510 is upscaled by a factor of two in each of the horizontal and vertical dimensions, such that each single binned L pixel value 425 can be considered as being upscaled into a respective 2-by-2 block of four upscaled L pixels 515. As illustrated, each binned L pixel value 425 can be considered as the value at the center of its corresponding 2-by-2 block of four upscaled L pixels 515. In some embodiments, each binned L pixel value 425 is directly mapped to a respective one of the upscaled L pixel 515 in a consistent manner. In the illustrated implementation, each binned L pixel value 425 is directly mapped to the upper-left upscaled L pixel 515 of its corresponding 2-by-2 block. For example, binned L pixel value 425-1 is mapped to upscaled L pixel 515a, and binned L pixel value 425-2 is mapped to upscaled L pixel 515b. After the upscaling, the upscaled L frame 510 can include substantially the same resolution as the L capture frame 134, but with a reduced pixel density. For example, the L capture frame 134 includes 16 "known" luminance values in 16 possible array locations to yield 100-percent pixel density; the upscaled L frame 510 includes the same 16 "known" luminance values, but in 64 possible array locations, yielding 25-percent pixel density. The remaining 48 array locations of the upscaled L frame 510 are "unknown," such that their respective data is undefined, empty, etc.

Each unknown array location of the upscaled L frame 510 can then be filled in by upsampling to produce the upsampled L guide frame 520. Embodiments can use any suitable interpolation technique to generate values for the unknown locations of the upscaled L frame 510. In some implementations, for each unassigned location, values of some or all known nearest-neighbor array locations (e.g., locations directly corresponding to binned L imaging pixel data in the L capture frame 134) are used to estimate a pixel value for the unassigned location. Other embodiments compute estimated L pixel 525 values using a bilinear technique. Other embodiments compute estimated L pixel 525 values using a bi-cubic technique.

In the upsampled L guide frame 520, cells with known luminance values from the upscaled L frame 510 are indicated with bold-face as L, and cells with upsampled luminance values computed from the known luminance values are indicated with italics as L'. For ease of reference, certain cells are also numbered. As an example of certain interpolation techniques noted above, the interpolation can proceed in an iterative manner. In one iteration, the value of cell L'1 can be interpolated from the values of its nearest-neighboring square of cells, L1, L2, L4, and L5, for example, by averaging the four known values to arrive at the single unknown value. Similarly, the unknown value of cell L'3 can be interpolated from the known values cells L2, L3, L5, and L6; the unknown value of cell L'6 can be interpolated from the known values cells L4, L5, L7, and L8; and the unknown value of cell L'8 can be interpolated from the known values cells L5, L6, L8, and L9. In a next iteration, interpolated valued from the preceding iteration can now be used to interpolate additional unknown values. For example, the nearest neighbors of L'2 are a diamond consisting of originally known cells L2 and L5, and previously interpolated cells L'1 and L'3. A similar approach can be used to interpolate the values of cells L'4, L'5, and L'7. Using such techniques, the entire L guide frame 520 can be upsampled with a combination of upscaled L pixels 515 and estimated L pixels 525 to achieve a 100-percent L pixel density in the L guide frame 520 with the target resolution of the LE component image 145.

Turning to FIGS. 6A-6C, each shows a flow diagram 600 of a portion of a remosaicking operation for a respective color plane of the RGB capture frame 132. While FIGS. 6A-6C illustrate a sequence of upsampling for green then red then blue, the RGB color planes can be upsampled in other orders. Further, while the result of the remosaicing of FIGS. 6A-6C is an LE component image 145 of a particular resolution and following a standard Bayer RGB pattern, the remosaicing can be adapted to result in LE component images 145 of other resolutions and/or other RGB patterns. Embodiments of the upsampling engine 140 can be configured to produce the LE component image 145 in accordance with a defined output image schema (or set of predefined output image schema), such as a particular resolution, CFA pattern, etc. For example, the LE component images 145 are configured to be digitally combined into a single HDR output image 175, and the output image schema defines a target resolution, CFA pattern, etc. for the HDR output image 175. The HDR output image 175 can be the image data output by the CIS system 110 to downstream components, such as the processor-controlled system 160. In some embodiments, the processor-controlled system 160 is designed to receive, from the CIS system 110, an output image frame that is formatted according to the particular output image schema. For example, the processor-controlled system 160 can be designed with standard physical and logical interfaces configured to receive an image frame from the CIS system 110 with a defined resolution and a conventional (e.g., standard Bayer RGB) CFA pattern. In such embodiments, the upsampling engine 140 is configured to generate the LE component images 145 to support such image frame parameters.

In FIG. 6A, a representative flow diagram 600a is shown for upsampling of the green color plane. The flow diagram 600a begins with an RGB capture frame 132 (e.g., RGB capture frame 132b of FIG. 2B). The RGB capture frame 132 is upscaled to produce an upscaled G frame 610g by assigning known binned G imaging pixel 415g of the RGB capture frame 132 to corresponding locations of the upscaled G frame 610g. The upscaled G frame 610g is configured to have the same size as that of the upscaled L frame 510 to support the target resolution of the LE component image 145. Similar to the description above with reference to FIG. 5, each binned G imaging pixel 415g approximates the green color information for a corresponding location in the captured scene, which can generally be considered as corresponding to some point in space relative to the upscaled G frame 610g (but not necessarily corresponding to any particular array location in the upscaled G frame 610g). As such, embodiments can choose a manner in which to map each binned G imaging pixel 415g to a particular upscaled G pixel 615g of a corresponding 2-by-2 block of upscaled G pixels 615g in the upscaled G frame 610g. To avoid introducing certain artifacts, it is can be desirable to map values in the L and RGB planes in a consistent manner. For example, if each binned L pixel value 425 is mapped to the upper-left upscaled L pixel 515 in its corresponding 2-by-2 block of the upscaled L frame 510, embodiments can similarly map each binned G imaging pixel 415g to the upper-left upscaled G pixel 615g in its corresponding 2-by-2 block of the upscaled G frame 610g. After the upscaling, the upscaled G frame 610g can have substantially the same resolution as the G color plane of the RGB capture frame 132, but with a reduced pixel density. For example, the RGB capture frame 132 includes 8 "known" G values in 16 possible array locations to yield 50-percent pixel density; the upscaled G frame 610g includes the same 8 "known" G values, but in 64 possible array locations, yielding 12.5-percent pixel density. The remaining 56 array locations of the upscaled G frame 610g are "unknown," such that their respective data is undefined, empty, etc.

Unknown G values in the upscaled G frame 610g can be filled in by upsampling to produce an upsampled G frame 620g. In some implementations, the upsampled G frame 620g is generated and stored as a separate array of G values. In other implementations, the upsampled G frame 620g represents the G color plane data of an upsampled RGB frame 620, which includes the upsampled G frame 620g and upsampled R and B frames, as described below. The upsampling of the upscaled G frame 610g can include at least two features. A first feature is that the upsampling interpolates G color values for a particular portion of the cells of the upsampled G frame 620g in accordance with a predefined target CFA pattern. A second feature is that the upsampling is luminance-guided interpolation based on the upsampled L guide frame 520.

Regarding the first feature, as noted above, an output image schema can define both a target resolution and a target CFA pattern for the LE component image 145 (and/or for the resulting HDR output image 175). These schema definitions can effectively define which cells of the upsampled G frame 620g (or of the upsampled RGB frame 620) are assigned to the G color plane. For example, the illustrated output image schema used for FIGS. 6A-6C assumes a standard Bayer RGB pattern that includes repeating 2-by-2 blocks of R, G, G, B pixels.

According to such a schema, every other cell in the frame is assigned to the G color plane in a checkerboard pattern. As such, the upsampling of the upscaled G frame 610g can be performed in a manner that interpolates G color values only for those cells assigned to the G color plane according to the output image schema. As illustrated, the upsampled G frame 620g resulting from the upsampling operation has 50-percent density of G pixels, corresponding to the target color plane resolution and that CFA pattern (Bayer RGB pattern) for the illustrative LE component image 145.

Regarding the second feature, the upsampling is referred to herein as "luminance-guided" interpolation, as the interpolation is guided by the L guide frame 520. As described above, the L guide frame 520 is upsampled to have 100-percent density of luminance information, such that every cell of the upsampled G frame 620g (e.g., and of the upsampled RGB frame 620, more generally) can have a one-to-one spatial correspondence with a respective one of the cells of the upsampled L guide frame 520. Thus, unknown G values in the upsampled G frame 620g are interpolated based both on neighboring known (or previously interpolated) G values and on local luminance information from the L guide frame 520. Embodiments can apply luminance-guided techniques to any suitable interpolation approach, such as to a nearest-neighbor, bi-cubic, or other approach. Luminance-guided interpolation can use the upsampled L guide frame 520 information in any suitable manner to weight and/or normalize G color information to improve interpolation in the G color plane. Some embodiments implement luminance-guided interpolation for a particular cell by using neighboring G color plane information to obtain a initial G color value for the cell, then weighting the initial G color value based on one or more local L values in corresponding locations of the L guide frame 520 to produce an estimated G pixel 625g for that cell. Other embodiments implement luminance-guided interpolation for a particular cell by weighting the neighboring G color plane information based on local L values in corresponding locations of the L guide frame 520 to obtain the initial G color value for the cell, then re-weighting the initial G color value based on the local L value in the location of the L guide frame 520 corresponding to the cell to produce the estimated G pixel 625g for that cell.

As one example of luminance-guided interpolation, the interpolation can proceed in an iterative manner. In one iteration, the estimated G pixel 625g value of cell G'4 can be interpolated from the values of its nearest-neighboring diamond of cells, G2, G3, G4, and G5. In one implementation, the four known values are averaged to arrive at a single initial value for G'4. The initial value can now be adjusted by differences in luminance information for corresponding cells of the L guide frame 520. For example, cells G2, G3, G4, G5, and G'4 of the upsampled G frame 620g spatially correspond to cells L2, L4, L6, L8, and L5 of the L guide frame 520, respectively. Some implementations use a color-ratio approach to multiply the average of the values of cells G2, G3, G4, and G5 by a ratio of the value of cell L5 to the average of the values of cells L2, L4, L6, and L8. Other implementations use a color-difference approach to find a difference between the value of cell L5 and the average of the values of cells L2, L4, L6, and L8, and add that difference to the average of the values of cells G2, G3, G4, and G5. The color difference approach can be preferred in some implementations, as it can be implemented without hardware divide operations. In both the color-ratio approach and the color-difference approach, spatially corresponding L values are used to adjust the interpolation in the color plane to account for local changes in luminance that would not otherwise be captured by the particular color plane information. Continuing with the example of luminance-guided interpolation, the same approach can be used to produce an estimated G pixel 625g value for cell G'5 based on cells G3, G5, G6, and G7 and spatially corresponding cells from the L guide frame 520. In subsequent iterations, previously interpolated values can be used for further interpolation in the same manner. For example, the same approach can be used to produce an estimated G pixel 625g value for cell G'14 based on cells G3, G'4, G=5, and G6 (its nearest neighbors), and spatially corresponding cells from the L guide frame 520 (L4, L5, L7, L8, and L'6).

Turning to FIG. 6B, a representative flow diagram 600b is shown for upsampling of the red color plane. The flow diagram 600b begins with an RGB capture frame 132 (e.g., RGB capture frame 132b of FIG. 2B). The RGB capture frame 132 is upscaled to produce an upscaled R frame 610r by assigning known binned R imaging pixel 415r of the RGB capture frame 132 to corresponding locations of the upscaled R frame 610r. The upscaled R frame 610r is configured to have the same size as that of the upscaled G frame 610g. Upscaling of the RGB capture frame 132 to produce the upscaled R frame 610r can be performed in the same manner as described for producing the upscaled G frame 610g. For example, each binned R imaging pixel 415r can be mapped to the upper-left upscaled R pixel 615r in a corresponding 2-by-2 block of the upscaled R frame 610r. In the illustrated case, the RGB capture frame 132 includes 4 "known" R values in 16 possible array locations to yield 25-percent pixel density for the R color plane; the upscaled R frame 610r includes the same 4 "known" R values, but in 64 possible array locations, yielding 6.25-percent pixel density. The remaining 60 array locations of the upscaled R frame 610r are "unknown," such that their respective data is undefined, empty, etc.

Unknown R values in the upscaled R frame 610r can be filled in by upsampling to produce an upsampled R frame 620r. In some implementations, the upsampled R frame 620r is generated and stored as a separate array of R values. In other implementations, the upsampled R frame 620r represents the R color plane data of an upsampled RGB frame 620, which includes the upsampled R frame 620r and upsampled G and B frames, as described below. For context, the G color plane cells (e.g., as previously produced in FIG. 6A) are indicated without shading in the upsampled R frame 620r. As described with reference to the G color plane in FIG. 6A, the upsampling of the upscaled R frame 610r can include at least two features: the upsampling interpolates R color values for a particular portion of the cells of the upsampled R frame 620r in accordance with the predefined target CFA pattern for the LE component image 145, and the upsampling is luminance-guided interpolation based on the upsampled L guide frame 520. Regarding the first feature, the illustrated upsampling in FIG. 6B is shown as producing R color values only for those cells assigned to the R color plane according to the output image schema. The illustrative result is an upsampled R frame 620r with 25-percent density of R pixels, corresponding to the target color plane resolution and that CFA pattern (Bayer RGB pattern) for the illustrative LE component image 145.

Regarding the second feature, the luminance-guided interpolation can be performed in a similar manner to any of the approaches described with reference to FIG. 6A. However, the particular case shown in FIG. 6B illustrates a couple of differences between the interpolation in FIG. 6A and that of FIG. 6B. First, in FIG. 6B (unlike in FIG. 6B), none of the known value locations of the upscaled R frame 610r directly coincide with R color plane cells in the upsampled R frame 620r. For reference, the upscaled R pixel 615r locations are shown relative to the upsampled R frame 620r, and it can be seen that the respective known values are not directly mapped to those locations (in fact those locations happen to correspond to cells in the G color plane). As such, all R values in the upsampled R frame 620r are estimated R pixel 625r values produced by luminance-guided interpolation.

Second, in FIG. 6B (unlike in FIG. 6B), the interpolated pixels are offset with respect to their neighboring pixels in the upsampled R frame 620r. For example, the estimated R pixel 625r indicated as R'1 is closer to its nearest-neighboring known values 615r1 and 615r3 than it is to its nearest-neighboring known values 615r2 and 615r4. Embodiments can address the offset in various ways, such as by using a weighted average based on linear distance. For example, an initial value for cell R'1 can be computed as (3*(R1+R3)± (R2+R4))/8, such that the closer nearest-neighbors have an increased effect on the average (e.g., by a factor of 3). The initial value can then be adjusted based on the L guide frame 520, using a color-ratio or color-difference approach, to compute the estimated R pixel 625r value for cell R'1. For example, cells 615r1, 615r2, 615r3, 615r4, and R'1 in the upsampled R frame 620r spatially correspond to cells L1, L3, L7, L9, and L'4 of the L guide frame 520, respectively. Some implementations use a color-ratio approach to multiply the initial value (i.e., the weighted average of the values of cells R1, R2, R3, and R4) by a ratio of the value of cell L'4 to the average of the values of cells L1, L3, L7, and L9. Other implementations use a color-difference approach to find a difference between the value of cell L'4 and the average of the values of cells L1, L3, L7, and L9, and add that difference to the initial value (i.e., the weighted average of the values of cells R1, R2, R3, and R4). Similar approaches can be used to produce estimated R pixel 625r values for all 16 R color plane cells of the upsampled R frame 620r.

Turning to FIG. 6C, a representative flow diagram 600c is shown for upsampling of the blue color plane. The flow diagram 600c begins with an RGB capture frame 132 (e.g., RGB capture frame 132b of FIG. 2B). The RGB capture frame 132 is upscaled to produce an upscaled B frame 610b by assigning known binned B imaging pixels 415b of the RGB capture frame 132 to corresponding locations of the upscaled B frame 610b. The upscaled B frame 610b is configured to have the same size as that of the upscaled G frame 610g and upscaled R frame 610r. Upscaling of the RGB capture frame 132 to produce the upscaled B frame 610b can be performed in the same manner as described for producing the upscaled G frame 610g and upscaled R frame 610r. For example, each binned B imaging pixel 415r can be mapped to the upper-left upscaled B pixel 615b in a corresponding 2-by-2 block of the upscaled B frame 610b.

In the illustrated case, the RGB capture frame 132 includes 4 "known" B values in 16 possible array locations to yield 25-percent pixel density for the B color plane; the upscaled B frame 610b includes the same 4 "known" B values, but in 64 possible array locations, yielding 6.25-percent pixel density. The remaining 60 array locations of the upscaled B frame 610b are "unknown," such that their respective data is undefined, empty, etc.

Unknown B values in the upscaled B frame 610*b* can be filled in by upsampling to produce an upsampled B frame 620*b*. In some implementations, the upsampled B frame 620*b* is generated and stored as a separate array of B values. In other implementations, the upsampled B frame 620*b* represents the B color plane data of an upsampled RGB frame 620, which includes the upsampled B frame 620*b* and upsampled G and R frames, as described below. For context, the G and R color plane cells (e.g., as previously produced in FIGS. 6A and 6B) are indicated without shading in the upsampled B frame 620*b*. As described with reference to the G and R color planes in FIGS. 6A and 6B, the upsampling of the upscaled B frame 610*b* can include at least two features: the upsampling interpolates B color values for a particular portion of the cells of the upsampled B frame 620*b* in accordance with the predefined target CFA pattern for the LE component image 145, and the upsampling is luminance-guided interpolation based on the upsampled L guide frame 520.

Regarding the first feature, the illustrated upsampling in FIG. 6C is shown as producing B color values only for those cells assigned to the B color plane according to the output image schema resulting in an upsampled B frame 620*b* with 25-percent density of B pixels located according to the target color plane resolution and that CFA pattern (Bayer RGB pattern) for the illustrative LE component image 145. Regarding the second feature, the luminance-guided interpolation can be performed in a similar manner to any of the approaches described with reference to FIGS. 6A and 6B. Similar to the R color plane, it can be seen that none of the known value locations of the upscaled B frame 610*b* directly coincide with B color plane cells in the upsampled B frame 620*b* (the known-value locations in the B color plane happen to correspond to cells in the G color plane). As such, all B values in the upsampled B frame 620*b* are estimated B pixel 625*b* values produced by luminance-guided interpolation.

Further, similar to the R color plane, the interpolated B pixels are all offset with respect to their neighboring pixels in the upsampled B frame 620*b*. As such, weighted averaging techniques can be applied. Some implementations can use a weighted bi-cubic approach similar to the one described with reference to FIG. 6B, with weightings adjusted based on the relative linear distances between each target cell and its nearest neighbors. Other implementations can use a weighted bi-linear approach to interpolate based only on two nearest neighbors, where appropriate. For example, cell B'1 is adjacent to known-value location 615*b*4 and only one cell removed from known-value location 615*b*2, but is appreciably further from either of known-value locations 615*b*1 or 615*b*3. As such, a more reliable interpolation for cell B'1 may be achieved using a weighted bi-cubic approach based on known values B2 and B4, and luminance-guided adjustment based on cells L5, L11, and L'10. Similar approaches can be used to produce estimated B pixel 625*b* values for all 16 B color plane cells of the upsampled B frame 620*b*.

After all the upscaling and upsampling operations of FIGS. 6A-6C, the result is a set of upsampled color frame data (i.e., an upsampled G frame 620*g*, an upsampled R frame 620*r*, and an upsampled B frame 620*b*) that interleaves to form an upsampled RGB frame 620. As described above, the upsampled RGB frame 620 has a resolution and a CFA pattern corresponding to a defined output image schema for the LE component image 145 (and/or HDR output image 175). In some cases, strict application of upsampling techniques described above can result in edge artifacts. Embodiments include edge-detection and/or edge-sensing algorithms to adapt the upsampling to edge regions. For example, such algorithms can detect gradients in different directions that indicate edge behaviors, and the algorithms can adjust pixel weightings for interpolation, accordingly. In effect, the algorithms tend to impact the weightings and/or computations used to obtain the initial value for a particular cell prior to luminance-guided adjustment of that initial value. Thus, embodiments can use the various luminance-guided adjustment approaches described above (e.g., based on color-ratio, color-difference, etc.) to implement luminance guided interpolation near the edges.

Returning again to FIG. 1, the output of the upsampling engine 140 is a set of LE component images 145, each representing a same image of a same scene at a same time, but with a different respective exposure time. As illustrated, embodiments of the CMOS image sensor system 110 can include an HDR engine 170. Embodiments of the sensor controller 150 can direct the HDR engine 170 to digitally combine the LE component images 145 to generate the HDR output image 175. As described above, the pixel-binned downsampling implemented by the binning readout circuitry 130 facilitates luminance guided upsampling by the upsampling engine 140, which can appreciably reduce sensor array 120 readout time without appreciably reducing image quality (e.g., preserving high-resolution color and luminance information across the sensor array). As such, these techniques can mitigate motion-related artifacts and defects within and/or between sub-frames, while producing high-quality LE component images 145 to support generation of a high-quality HDR output image 175. Embodiments can generated the HDR output image 175 to accord with any output image schema, storage considerations, communication protocols, and/or other features or constraints to support downstream usage of the HDR output image 175. For example, the HDR output image 175 is communicated to any suitable processor-controlled system 160 for downstream processing, further communication, etc.

Figure 9:
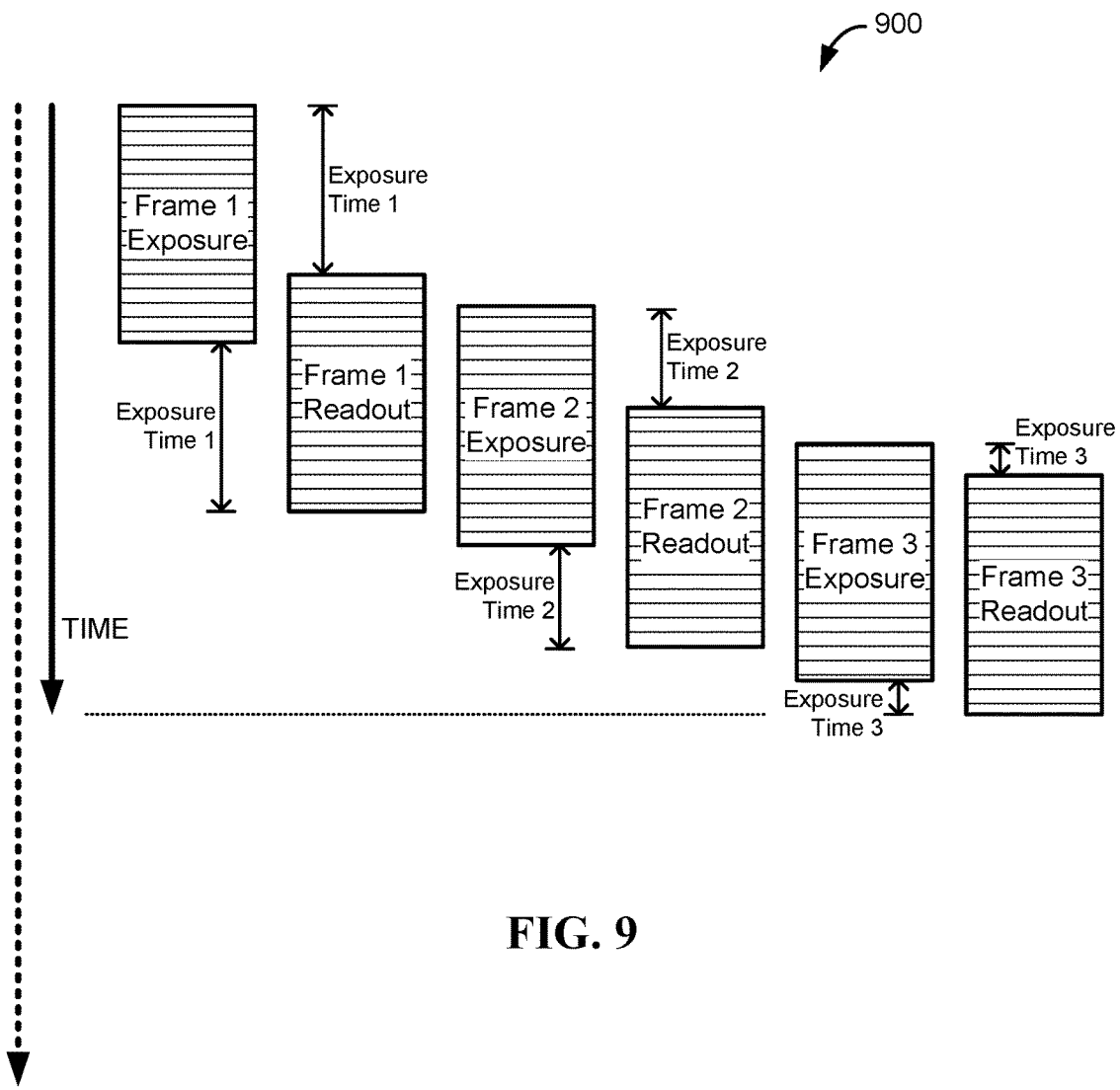
FIG. 9 shows a flow diagram representation of a novel staggered HDR approach that uses the types of pixel-binned downsampling described herein for reduced-time image sensor readout.

FIG. 9 shows a flow diagram 900 representation of a novel staggered HDR approach that uses the types of pixel-binned downsampling described herein for reduced-time image sensor readout. As described above with reference to FIGS. 7 and 8, the vertical dimension generally represents time, and the horizontal dimension generally represents an array width. During a "Frame 1 Exposure" window, photo-sensors of the array are exposed, row by row. After some "Exposure Time 1", row-wise readout of the array begins. The readout of this first sub-frame takes some amount of time, defining the height of the "Frame 1 Readout" window. As noted with reference to FIGS. 7 and 8 above, the duration of the exposure windows is also dictated by the sub-frame readout times to ensure that all rows of the sensor array, from the first to the last, are exposed for the same amount of time prior to readout. The pixel-binning during readout of each row appreciably reduces the number of values being read out in each row (i.e., the number of ADC read operations), thereby appreciably reducing the sub-frame readout time, regardless of which staggered readout approach is used (e.g., row interleaving, or the like). For example, downsampling by a factor of two (e.g., generating each RGB capture frame 132 and each L capture frame 134 to have a quarter of the native resolution of the sensor array) results in half as many photo-sensor output levels being read out per row.

The more the row-wise readout time is reduced, the less wait time is needed between each sub-frame exposure. For example, in the Frame 1 Exposure window, the first row of imaging pixels begins to be exposed at time T0, and the readout of the first row of imaging pixels is read out (the Frame 1 Readout window begins) at time T0+Exposure Time 1. After readout of the first row for the first sub-frame is complete, the imaging pixels in that row can be reset and can begin to be re-exposed for Exposure Time 2 corresponding to the second sub-frame. As illustrated, then, the Frame 2 Exposure window can begin shortly after the Frame 1 Readout window begins, and the Frame 3 Exposure window can begin shortly after the Frame 2 Readout window begins. Thus, reducing the row-wise readout time can both shorten the overall duration of each sub-frame readout window (e.g., the Frame 1 Readout window is shortened) and shorten the wait time between each sub-frame exposure of the same row of pixels. For the sake of comparison, the total image capture exposure and readout duration for FIG. 9 is indicated by the vertical arrow labeled "Time," and the corresponding total image capture exposure and readout duration for the conventional cases of FIGS. 7 and 8 is indicated by a vertical dashed arrow adjacent to the arrow labeled "Time."

While descriptions herein refer to exposure, readout, and the like as occurring on a row-wise basis, the novel techniques described herein can similarly be applied to other pixel architectures. As one example, rather than addressing, exposing, and reading out imaging pixels one row at a time, the image sensor circuitry can be designed to address, expose, and readout imaging pixels multiple rows at a time. As another example, some image sensor systems can be configured to be addressed, exposed, read out, etc. in a line-wise fashion, column-wise fashion, section-wise fashion (e.g., row- or column-wise by quadrant), etc.

Figure 10:
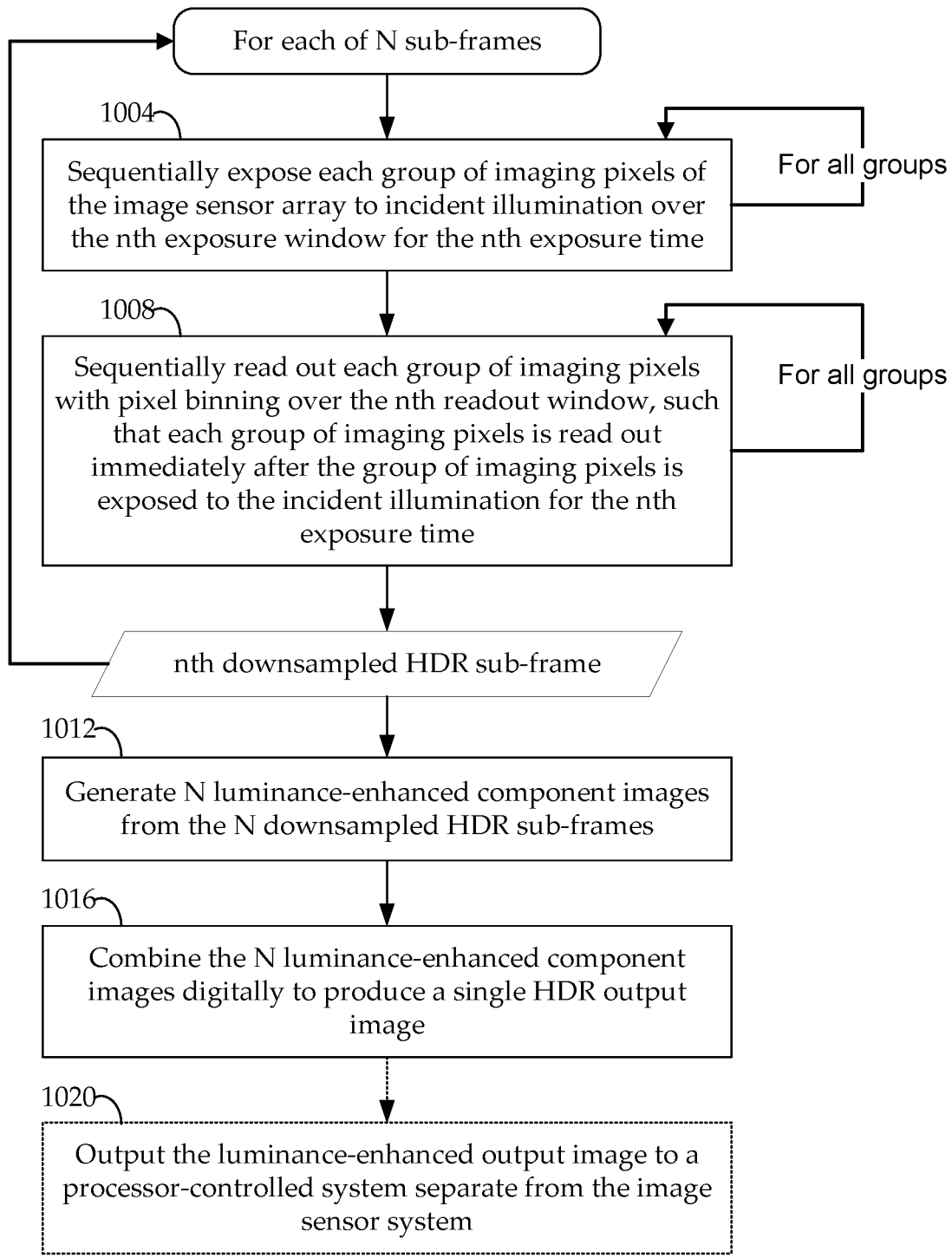
FIG. 10 shows a flow diagram of an illustrative method for high-dynamic-range (HDR) image capture using an image sensor system, according to various embodiments described herein.

FIG. 10 shows a flow diagram of an illustrative method 1000 for high-dynamic-range (HDR) image capture using an image sensor system, according to various embodiments described herein. As described herein, the image sensor system has an image sensor array formed by a plurality of imaging pixels configured in accordance with a red-green-blue-luminance (RGBL) color filter array (CFA) pattern. The RGBL CFA pattern can include at least 50-percent luminance pixels (e.g., 50 percent, 75 percent, etc.). The imaging pixels can each include at least one photo-sensor optically coupled with a color filter. The image sensor array can be configured so that the imaging pixels are arranged to be addressable in groups of imaging pixels to facilitate pixel binning. For example, a sensor controller can be used to concurrently set a group of adjacent imaging pixels into an exposure mode, in which the group of imaging pixels concurrently accumulate photocharge in response to being exposed to incident illumination; and the sensor controller can be used to concurrently set a group of adjacent imaging pixels into a readout mode, in which the photocharge accumulated by the group of imaging pixels is concurrently read out as one or more pixel-binned output values. As such, a particular group of imaging pixels can be a set of pixel-binning groups on one or more rows and one or more columns of the image sensor array. For example, a group of imaging pixels can correspond to a particular "line" of the image sensor array, which can include multiple adjacent rows of imaging pixels to facilitate pixel-binning from across the multiple rows (e.g., pixel-binning of diagonally adjacent imaging pixels of a same color).

Embodiments of the method 1000 can begin by sequentially iterating through stages 1004 and 1008 for all the groups of imaging pixels and for each of N sub-frames, where N is an integer greater than 1. Each nth sub-frame of the N sub-frames (i.e., n=1 to N) is associated with an nth exposure window and with an nth readout window, and each nth readout window starts an nth exposure time after the start of the nth exposure window. For example, FIG. 9 shows the Frame 1 Exposure window preceding the Frame 1 Readout window by Exposure Time 1, the Frame 2 Exposure window preceding the Frame 2 Readout window by Exposure Time 2, and the Frame 3 Exposure window preceding the Frame 3 Readout window by Exposure Time 3. Each nth exposure time is a different amount of time. For example, N can represent three sub-frames associated with three different exposure times, and all imaging pixels of the image sensor array are sequentially exposed in each nth exposure window and read out in each nth readout window in each sub-frame iteration.

At each iteration of stage 1004, a next set of one or more groups of pixels is sequentially exposed to incident illumination over the nth exposure window for the nth exposure time. For example, the imaging pixels can be signaled to cause a rolling exposure of one or more groups of imaging pixels at a time. At each iteration of stage 1008, the same set of groups of imaging pixels is sequentially read out with pixel binning over the nth readout window, such that each group of imaging pixels is read out immediately after the group of imaging pixels is exposed to the incident illumination for the nth exposure time. As illustrated, the pixel binning results, at an end of each nth readout window, in a respective one of N downsampled HDR sub-frames. Each downsampled HDR sub-frame has a respective RGB capture frame and a respective L capture frame. For example, as groups of color imaging pixels are sequentially read out with pixel binning over iterations of stage 1008, the pixel-binned color values are stored into a data framework representing the respective RGB capture frame; and as groups of luminance imaging pixels are sequentially read out with pixel binning over iterations of stage 1008, the pixel-binned luminance values are stored into a data framework representing the respective L capture frame; such that after all groups of imaging pixels have been read out with pixel binning, the result is a complete RGB capture frame and a complete L capture frame.

While stages 1004 and 1008 are illustrated as each iterating for all groups of pixels in a serial manner, stages 1004 and 1008 actually occur in an overlapping fashion to ensure that each group of imaging pixels is exposed for the same amount of time prior to readout in each sub-frame. For example, a first set of groups of imaging pixels begins to be exposed at an exposure start time (Tes1) and begins to be read out at a readout start time (Trs1), which immediately follows one nth exposure time after Tes1 (i.e., Trs1=Tes1+nth exposure time). A second set of groups of imaging pixels begins to be exposed at Tes2 and begins to be read out at Trs2, where Trs2=Tes2+nth exposure time. Suppose there are G sets of groups of imaging pixels in the image sensor array. Because the image sensor system takes a fixed amount of readout time (Tro) to readout each set of groups of imaging pixels, each Trsg (representing the gth readout start time for the gth set of groups of imaging pixels, where g=1 to G) occurs one Tro after each Trs(g−1). To ensure that each group of imaging pixels is exposed for the same amount of time prior to readout in each sub-frame, each Tesg also occurs one Tro after each Tes(g−1). Assuming the nth exposure time is less than G*Tro (i.e., the total time to read out all groups of imaging pixels of the entire image sensor array), stage 1004 will still be iterating on (sequentially exposing) remaining groups of imaging pixels when stage 1008 begins to iterate on (sequentially read out) the first group of pixels, and stage 1008 will still be iterating on remaining groups of imaging pixels when stage 1004 has finished iterating through all groups of imaging pixels.

At stage 1012, embodiments can generate N luminance-enhanced component images from the N downsampled HDR sub-frames. For example, for each of the N downsampled HDR sub-frames, embodiments can upsample the respective L capture frame to generate a respective L guide frame. Embodiments can then apply luminance-guided interpolation to the respective RGB capture frame based on the respective L guide frame to upsample the respective RGB capture frame to form a respective one of the N luminance-enhanced component images. In some embodiments, upsampling the respective L capture frame to generate the respective L guide frame includes: upscaling the respective L capture frame to generate a respective upscaled L frame having a target frame size defined by an output image schema of an HDR output image (which will be produced in stage 1016 below), a portion of the respective upscaled L frame populated based on known luminance values from the respective L capture frame; and upsampling the respective upscaled L frame to generate the respective L guide frame based on interpolating the known luminance values, such that the respective L guide frame has 100-percent density of luminance information. In some embodiments, applying luminance-guided interpolation to the respective RGB capture frame includes, for each color plane of the RGB capture frame: upscaling the color plane to generate a respective upscaled color frame, such that the respective upscaled color frame has a target frame size defined by an output image schema of the HDR output image, and a portion of the respective upscaled color frame is populated based on respective known color values from the color plane; and upsampling the respective upscaled color frame to generate a respective upsampled color frame by applying the luminance-guided interpolation to the respective known color values based on the respective L guide frame. In some embodiments, for each of the N downsampled HDR sub-frames: the respective L guide frame includes an array of L value cells, each having a respective luminance value; and applying the luminance-guided interpolation to the respective RGB capture frame includes generating a respective upsampled RGB frame to have an array of color value cells by, for each color value cell of a portion of the color value cells: generating an initial value for the color value cell based on interpolating a neighboring set of known color values based on the respective RGB capture frame; and computing an estimated color pixel value for the color value cell by adjusting the initial value based on the luminance values of those of the L value cells spatially corresponding to the color value cell and to the locations of the neighboring set of known color values. In some embodiments, the adjusting includes: computing a color-ratio or a color-difference between the L value cell spatially corresponding to the color value cell, and those of the L value cells spatially corresponding to the locations of the neighboring set of known color values; and adjusting the initial value of the color value cell based on the color-ratio or the color-difference.

At stage 1016, embodiments can combine the N luminance-enhanced component images digitally to produce a single HDR output image. In some embodiments, the image sensor array has a native resolution; for each of the N downsampled HDR sub-frames, the respective RGB capture frame can be generated to have a downsampled resolution that is less than or equal to one-fourth of the native resolution; and each of the N luminance-enhanced component images is generated to have an output resolution that is at least three times the downsampled resolution. The output resolution of each luminance-enhanced component image can be the same as the resolution of the produced HDR output image. For example, producing the HDR output image can involve digitally combining full-resolution data from the multiple luminance-enhanced component images. In some implementations, the resolution of the produced HDR output image can be the same as the native resolution of the image sensor array. Some embodiments, at stage 1020, can output the HDR output image to a processor-controlled system separate from the image sensor system.

It will be understood that, when an element or component is referred to herein as "connected to" or "coupled to" another element or component, it can be connected or coupled to the other element or component, or intervening elements or components may also be present. In contrast, when an element or component is referred to as being "directly connected to," or "directly coupled to" another element or component, there are no intervening elements or components present between them, It will be understood that, although the terms "first," "second," "third," etc. may be used herein to describe various elements, components, these elements, components, regions, should not be limited by these terms. These terms are only used to distinguish one element, component, from another element, component. Thus, a first element, component, discussed below could be termed a second element, component, without departing from the teachings of the present invention. As used herein, the terms "logic low," "low state," "low level," "logic low level," "low," or "0" are used interchangeably. The terms "logic high," "high state," "high level," "logic high level," "high," or "1" are used interchangeably.

As used herein, the terms "a", "an" and "the" may include singular and plural references. It will be further understood that the terms "comprising", "including", "having" and variants thereof, when used in this specification, specify the presence of stated features, steps, operations, elements, and/or components, but do not preclude the presence or addition of one or more other features, steps, operations, elements, components, and/or groups thereof In contrast, the term "consisting of" when used in this specification, specifies the stated features, steps, operations, elements, and/or components, and precludes additional features, steps, operations, elements and/or components. Furthermore, as used herein, the words "and/or" may refer to and encompass any possible combinations of one or more of the associated listed items.

While the present invention is described herein with reference to illustrative embodiments, this description is not intended to be construed in a limiting sense. Rather, the purpose of the illustrative embodiments is to make the spirit of the present invention be better understood by those skilled in the art. In order not to obscure the scope of the invention, many details of well-known processes and manufacturing techniques are omitted. Various modifications of the illustrative embodiments, as well as other embodiments, will be apparent to those of skill in the art upon reference to the description. It is therefore intended that the appended claims encompass any such modifications.

Furthermore, some of the features of the preferred embodiments of the present invention could be used to advantage without the corresponding use of other features. As such, the foregoing description should be considered as merely illustrative of the principles of the invention, and not in limitation thereof. Those of skill in the art will appreciate variations of the above-described embodiments that fall within the scope of the invention. As a result, the invention is not limited to the specific embodiments and illustrations discussed above, but by the following claims and their equivalents.

What is claimed is:

1. A method for high-dynamic-range (HDR) image capture using an image sensor system having an image sensor array formed by a plurality of imaging pixels configured in accordance with a red-green-blue-luminance (RGBL) color filter array (CFA) pattern and arranged to be addressable in groups of imaging pixels, the method comprising:
for each of N sub-frames, each nth sub-frame of the N sub-frames associated with an nth exposure window and with an nth readout window, each nth readout window starting an nth exposure time after the start of the nth exposure window, N being an integer greater than 1:
sequentially exposing each group of imaging pixels of the image sensor array to incident illumination over the nth exposure window for the nth exposure time; and
sequentially reading out each group of imaging pixels with pixel binning over the nth readout window, such that each group of imaging pixels is read out immediately after the group of imaging pixels is exposed to the incident illumination for the nth exposure time, and the pixel binning results, at an end of the nth readout window, in a respective one of N downsampled HDR sub-frames having a respective RGB capture frame and a respective L capture frame;
generating N luminance-enhanced component images by, for each of the N downsampled HDR sub-frames, upsampling the respective L capture frame to generate a respective L guide frame, and applying luminance-guided interpolation to the respective RGB capture frame based on the respective L guide frame to upsample the RGB capture frame to form a respective one of the N luminance-enhanced component images; and
combining the N luminance-enhanced component images digitally to produce a single HDR output image.

2. The method of claim 1, wherein:
each (n+1)th readout window starts prior to the end of each nth readout window.

3. The method of claim 1, wherein:
for each group of imaging pixels, reading out the group of imaging pixels with pixel binning consumes a group readout time, R, such that a duration of each readout window is R times a total number of groups of imaging pixels of the image sensor array;
each nth exposure window starts at a respective exposure start time, Tes(n); and
each Tes(n+1) is greater than a sum of each Tes(n) and the nth exposure time and R, and each Tes(n+1) is less than a sum of each Tes(n) and the nth exposure time and 2R.

4. The method of claim 1, further comprising:
outputting the HDR output image to a processor-controlled system separate from the image sensor system.

5. The method of claim 1, wherein the upsampling the respective L capture frame to generate the respective L guide frame comprises:
upscaling the respective L capture frame to generate a respective upscaled L frame having a target frame size defined by an output image schema of the HDR output image, a portion of the respective upscaled L frame populated based on known luminance values from the respective L capture frame; and
upsampling the respective upscaled L frame to generate the respective L guide frame based on interpolating the known luminance values, such that the respective L guide frame has 100-percent density of luminance information.

6. The method of claim 1, wherein the applying luminance-guided interpolation to the respective RGB capture frame comprises, for each color plane of the RGB capture frame:
upscaling the color plane to generate a respective upscaled color frame, such that the respective upscaled color frame has a target frame size defined by an output image schema of the HDR output image, and a portion of the respective upscaled color frame is populated based on respective known color values from the color plane; and
upsampling the respective upscaled color frame to generate a respective upsampled color frame by applying the luminance-guided interpolation to the respective known color values based on the respective L guide frame.

7. The method of claim 1, wherein, for each of the N downsampled HDR sub-frames:
the respective L guide frame comprises an array of L value cells, each having a respective luminance value; and
the applying luminance-guided interpolation to the respective RGB capture frame comprises generating a respective upsampled RGB frame to have an array of color value cells by, for each color value cell of a portion of the color value cells:
generating an initial value for the color value cell based on interpolating a neighboring set of known color values based on the respective RGB capture frame; and
computing an estimated color pixel value for the color value cell by adjusting the initial value based on the luminance values of those of the L value cells spatially corresponding to the color value cell and to the locations of the neighboring set of known color values.

8. The method of claim 7, wherein the adjusting comprises:
computing a color-ratio or a color-difference between the L value cell spatially corresponding to the color value cell, and those of the L value cells spatially corresponding to the locations of the neighboring set of known color values; and
adjusting the initial value of the color value cell based on the color-ratio or the color-difference.

9. The method of claim 1, wherein:
the image sensor array has a native resolution;
for each of the N downsampled HDR sub-frames, the respective RGB capture frame has a downsampled resolution that is less than or equal to one-fourth of the native resolution; and
each of the N luminance-enhanced component images is generated to have an output resolution that is at least three times the downsampled resolution.

10. The method of claim 9, wherein the output resolution is equal to the native resolution.

11. The method of claim 1, wherein the RGBL CFA pattern of the image sensor array has a 50-percent density of luminance imaging pixels and a 50-percent density of color imaging pixels.

12. The method of claim 1, wherein the RGBL CFA pattern of the image sensor array has a 75-percent density of luminance imaging pixels and a 25-percent density of color imaging pixels.

13. The method of claim 1, wherein N is at least 3.

14. An image sensor comprising:
an image sensor array formed by a plurality of imaging pixels configured in accordance with a red-green-blue-luminance (RGBL) color filter array (CFA) pattern and arranged to be addressable in groups of imaging pixels;
binning readout circuitry coupled with the image sensor array to read out the groups of imaging pixels using pixel binning to generate N downsampled high-dynamic-range (HDR) sub-frames, each having a respective RGB capture frame and a respective L capture frame, N being an integer greater than 1;
a sensor controller configured to generate each of the N downsampled HDR sub-frames by:
directing, over a respective exposure window, sequential exposing of each group of imaging pixels of the image sensor array to incident illumination for a respective exposure time associated with the downsampled HDR sub-frame; and
directing, over a respective readout window, sequential reading out of each group of imaging pixels by the binned readout circuitry, such that each group of imaging pixels is read out immediately after the group of imaging pixels is exposed to the incident illumination for the respective exposure time, and such that the pixel binning results, at an end of the respective readout window with the respective RGB capture frame and the respective L capture frame for the downsampled HDR sub-frame;
an upsampling engine coupled with the binning readout circuitry to generate a N luminance-enhanced output images by, for each downsampled HDR sub-frame, applying luminance-guided interpolation to the respective RGB capture frame based on the L capture frame; and
an HDR engine to generate a single HDR output image by digitally combining the N luminance-enhanced output images.

15. The image sensor of claim 14, wherein the respective readout windows for the N downsampled HDR sub-frames overlap in time.

16. The image sensor of claim 14, wherein:
for each group of imaging pixels, reading out the group of imaging pixels with pixel binning consumes a group readout time, R, such that a duration of each readout window is R times a total number of groups of imaging pixels of the image sensor array;
the respective nth exposure window for each of the N downsampled HDR sub-frames starts at a respective exposure start time, Tes(n); and
each Tes(n+1) is greater than a sum of each Tes(n) and the nth exposure time and R, and each Tes(n+1) is less than a sum of each Tes(n) and the nth exposure time and 2R.

17. The image sensor of claim 14, wherein:
the sensor controller is further coupled the upsampling engine to direct generating the N luminance-enhanced component images by, for each of the N downsampled HDR sub-frames, upsampling the respective L capture frame to generate a respective L guide frame, and applying luminance-guided interpolation to the respective RGB capture frame based on the respective L guide frame to upsample the RGB capture frame to form a respective one of the N luminance-enhanced component images.

18. The image sensor of claim 17, wherein the upsampling engine is to upsample the L capture frame to generate the L guide frame by:
upscaling the L capture frame to generate an upscaled L frame having a target frame size defined by an output image schema of the HDR output image, a portion of the frame populated based on known luminance values from the L capture frame; and
upsampling the upscaled L frame to generate the L guide frame based on interpolating the known luminance values, such that the L guide frame has 100-percent density of luminance information.

19. The image sensor of claim 14, wherein, for each of the N downsampled HDR sub-frames, the upsampling engine is to apply the luminance-guided interpolation to the respective RGB capture frame, for each color plane of the respective RGB capture frame, by:
upscaling the color plane to generate a respective upscaled color frame, such that the respective upscaled color frame has a target frame size defined by an output image schema of the HDR output image, and a portion of the respective upscaled color frame is populated based on known color values from the color plane; and
upsampling the respective upscaled color frame to generate a respective upsampled color frame by applying the luminance-guided interpolation to the known color values based on the L guide frame.

20. The image sensor of claim 14, wherein:
the image sensor array has a native resolution;
for each of the N downsampled HDR sub-frames, the respective RGB capture frame has a downsampled resolution that is less than or equal to one-fourth of the native resolution; and
each of the N luminance-enhanced output images has an output resolution that is at least three times the downsampled resolution.

* * * * *